United States Patent [19]
Mathews

[11] Patent Number: 5,862,212
[45] Date of Patent: Jan. 19, 1999

[54] METHOD AND STRUCTURE FOR DETECTING A CUSTOMER PREMISES EQUIPMENT ALERTING SIGNAL

[75] Inventor: Michael T. Mathews, Morgan Hill, Calif.

[73] Assignee: CIDCO Incorporated, Morgan Hill, Calif.

[21] Appl. No.: 705,911

[22] Filed: Aug. 29, 1996

Related U.S. Application Data

[63] Continuation of Ser. No. 387,666, Feb. 13, 1995, abandoned.

[51] Int. Cl.$^6$ ................................................... H04M 1/50
[52] U.S. Cl. ........................ 379/386; 379/257; 379/283; 379/351
[58] Field of Search ..................... 379/386, 351, 379/283, 257, 377, 372; 84/600, 603; 364/724.09, 724.06, 724.08

[56] References Cited

U.S. PATENT DOCUMENTS

| | | | |
|---|---|---|---|
| 4,395,595 | 7/1983 | Nishitani et al. | 379/386 |
| 4,669,114 | 5/1987 | Reesor et al. | 379/257 |
| 5,109,409 | 4/1992 | Bomgardner et al. | 379/257 |
| 5,251,256 | 10/1993 | Crowe et al. | 379/386 |
| 5,307,404 | 4/1994 | Yatsunami | 379/386 |
| 5,353,342 | 10/1994 | Pietrowicz | 379/257 |

FOREIGN PATENT DOCUMENTS

A-566928  10/1993  Australia.

OTHER PUBLICATIONS

IEE Journal Of Solid–State Circuits, vol. 26, No. 7, Jul. 1991, New York, NY–USA, pp. 1027–1037, XP000237045, R. Becker et al: "Sigfred: A Low–Power DTMF and Signaling Frequency Detector".

Primary Examiner—Krista Zele
Assistant Examiner—Jacques Saint-Surin
Attorney, Agent, or Firm—Skjerven, Morrill, MacPherson, Franklin & Friel LLP; Alan H. MacPherson; Serge J. Hodgson

[57] ABSTRACT

A method and device for detecting a customer premises equipment alerting signal (CAS) tone in a telephone system which has both caller identification and call waiting. The present invention distinguishes between valid CAS tones transmitted by the telephone company central office and invalid CAS tones which are caused by music or a human voice. The present invention samples detected tone during a plurality of sample periods. The change of frequency, as well as the direction of frequency change, between successive sample periods is calculated. The number of transitions in the direction of frequency change are counted and used to determine whether the detected tone corresponds to a valid CAS tone or an invalid CAS tone.

26 Claims, 22 Drawing Sheets

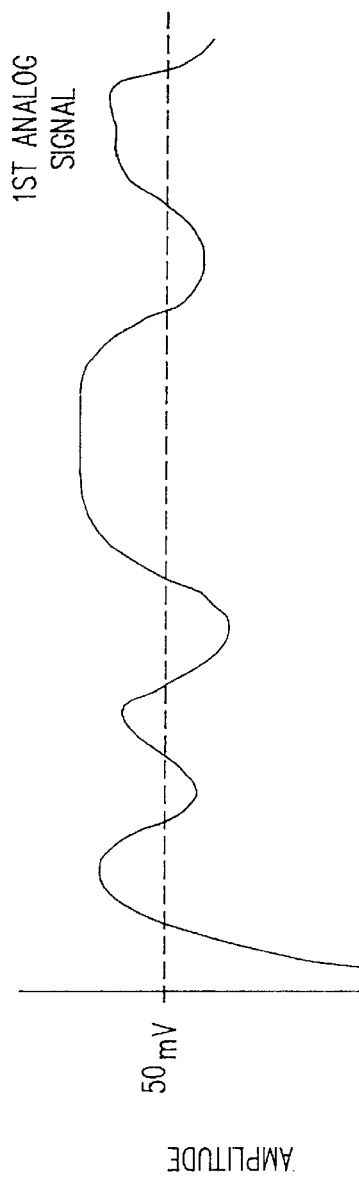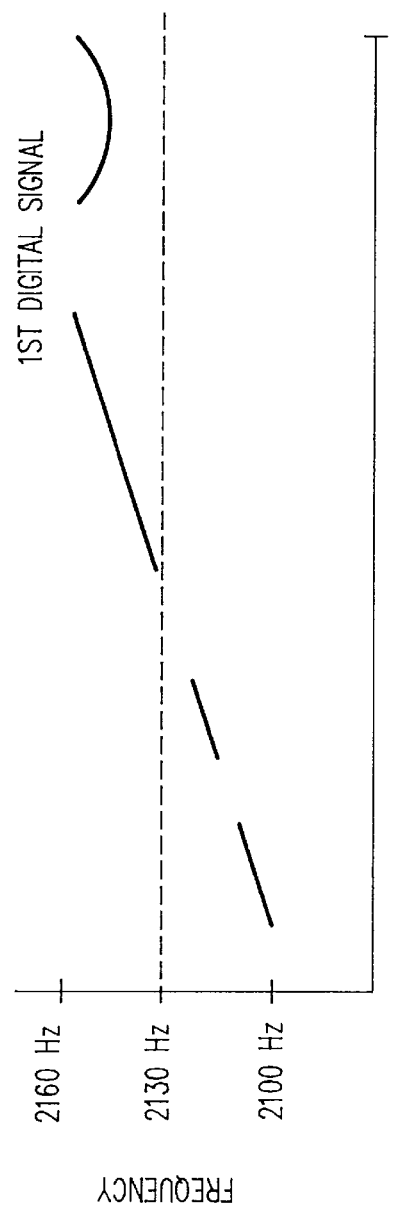

METHOD AND STRUCTURE FOR DETECTING A CUSTOMER PREMISES EQUIPMENT ALERTING SIGNAL

This application is a continuation of application Ser. No. 08/387,666, filed Feb. 13, 1995 now abandoned.

CROSS REFERENCE TO MICROFICHE APPENDIX

Appendix A, which is a part of this disclosure, is a microfiche appendix consisting of 1 sheet of microfiche having a total of 33 frames. Microfiche Appendix A is a list of computer programs and related data in one embodiment of the present invention, which is described more completely below.

A portion of the disclosure of this patent document contains materials which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates to a structure and method of detecting signals transmitted on a telephone system and more specifically to the detection of signals on a telephone system during the time that a customer's telephone is in an off hook condition.

DESCRIPTION OF THE PRIOR ART

Call waiting and caller identification (ID) are well known concepts in the telephone industry. With call waiting, a telephone customer who is speaking with another party on the telephone can receive a subscriber access signal (SAS) tone in the telephone receiver which indicates that the customer has another incoming call. The telephone customer then has the choice of ignoring the incoming call or answering the incoming call (by pressing a preselected button on the telephone handset). If the customer answers the incoming call, the original call is placed on "hold."

With caller ID, the telephone company transmits encoded information to the customer's telephone between the first and second ring signals. This encoded information (caller ID information) typically includes the name and phone number of the calling party. The telephone customer may purchase or lease customer premises equipment (CPE) which decodes and displays the encoded information before the customer picks up the phone.

Recently, the two concepts of caller ID and call waiting have been combined to create caller ID call waiting (CIDCW). CIDCW requires that the telephone customer have a CPE connected to the telephone line. When the telephone customer is speaking on the telephone and receives another call, a SAS tone followed by a CPE alerting signal tone (i.e., a CAS tone) is transmitted from a central office of the telephone company to the CPE. The CAS tone is similar to a dual tone multi-frequency (DTMF) signal, but has higher frequencies and is of a lower amplitude. The CAS tone consists of two signals: a 2130 hz signal and a 2750 hz signal. The frequencies of the signals used in the CAS tone are relatively prime with respect to the voice harmonics of a single base frequency. Consequently, harmonics of the human voice causing an inadvertent CAS detection will be minimized. A CAS tone lasts approximately 75–85 msec.

Once the CPE detects a CAS tone, the CPE must transmit an acknowledge signal to the telephone company central office before the telephone company will transmit the caller ID information. The acknowledge signal has been defined to be the DTMF signal "D". During the transmission of the acknowledge signal, the CPE disconnects the voice path of the customer's telephone and the telephone company central office mutes the acknowledge signal so that the party to whom the customer is talking does not hear the acknowledge signal. Upon receiving the acknowledge signal, the telephone company transmits the caller ID information to the CPE.

An inherent problem in the implementation of CIDCW is that the CPE must distinguish between a CAS tone and voice tones which are received from the customer or the party on the other end of the telephone line. A human voice (or music) is capable of creating signals on the telephone line at the frequencies of 2130 and 2750 hz. If the CPE misinterprets such voice signals to be a CAS tone, an event referred to as "talk off" occurs. During "talk off", the CPE temporarily disconnects the voice path of the telephone customer and transmits an acknowledge signal. However, the central office is unaware that the acknowledge signal is being transmitted because the central office did not transmit a CAS tone. Therefore, the central office does not mute the acknowledge signal. As a result, the party on the other end of the line hears the loud tones of the acknowledge signal. "Talk off" is therefore an undesirable event which should be minimized.

The number of "talk off" events can be minimized by reducing the sensitivity of the signal detecting circuitry within the CPE. This reduced sensitivity makes it less likely that a human voice (or music) will be mistaken for a CAS tone. However, this reduced sensitivity also reduces the probability that the CPE will detect a valid CAS tone. The failure of a CPE to detect a valid CAS tone is referred to as "talk down." Talk down is also an undesirable event.

It would therefore be desirable to have a CPE which minimizes the occurrence of "talk down" and "talk off." That is, it would be desirable to have a CPE which reliably detects and responds to valid CAS tones, while ignoring human voice tones which inadvertently approximate a CAS tone.

SUMMARY OF THE INVENTION

Accordingly, the present invention provides a method of determining whether a detected tone corresponds to a valid CAS tone. This method comprises the steps of (1) sampling a frequency of the detected tone during a plurality of sample periods, (2) calculating the change of frequency between successive sample periods, (3) determining a direction of frequency change between successive sample periods, (4) counting the number of transitions which occur in the direction of frequency change, and (5) using the number of transitions to determine whether the detected tone corresponds to a valid CAS tone.

The number of transitions in the direction of frequency change can be used to determine whether the detected tone is a valid CAS tone, a valid CAS tone combined with human speech, or human speech, because of the frequency characteristics associated with CAS tones and human speech.

A valid CAS tone or a valid CAS tone modified by human speech will typically contain many transitions in the direction of frequency change. In contrast, human speech will typically undergo fewer transitions in the direction of frequency change. Consequently, the greater the number of transitions in the direction of frequency change, the higher the probability that a CAS tone is present. In one embodiment, the detected tone will be confirmed to be a valid CAS tone only if the number of transitions exceeds a preselected number.

In another embodiment of the invention, a method of determining whether the detected tone corresponds to a valid CAS tone includes the steps of (1) sampling the frequency of the detected tone during a plurality of sample periods, (2) determining whether the sampled frequency represents a valid sample period of a CAS tone (3) calculating the change of frequency between successive valid sample periods, (4) maintaining a continuity sum of each calculated change of frequency (5) maintaining a continuity count of the pairs of successive valid sample periods, (6) dividing the continuity sum by the continuity count to obtain an average change of frequency, and (7) using the average change of frequency to select a frequency tolerance which the detected tone must meet to find correspondence with a valid CAS tone.

In a particular embodiment, a relatively narrow frequency tolerance is used when there is a high average change of frequency (i.e., when the detected tone has a relatively unstable frequency), and a relatively broad frequency tolerance is used when there is a low average change of frequency (i.e., when the detected tone has a relatively stable frequency).

In another embodiment of the invention, a method of determining whether the detected tone corresponds to a valid CAS tone includes the steps of (1) sampling the detected signal during a plurality of sample periods, (2) during each sample period, determining whether the detected signal has a first frequency component within a first frequency range which includes the first nominal frequency of the CAS tone, (3) during each sample period, determining whether the detected signal has a second frequency component within a second frequency range which includes the second nominal frequency of the CAS tone, (4) maintaining a first count of the number of sample periods during which the first frequency component is within the first frequency range, (5) maintaining a second count of the number of sample periods during which the second frequency component is within the second frequency range, and (6) using the first and second counts to determine whether the detected signal corresponds to a valid CAS tone. In a particular embodiment, the detected signal will be determined to correspond to a valid CAS tone only if the total of the first and second counts exceeds a preselected number.

This embodiment can also include the steps of (7) during each sample period, determining whether the first frequency component does not have a frequency within the first frequency range, (8) during each sample period, determining whether the second frequency component does not have a frequency within the second frequency range, (9) maintaining a third count of the number of sample periods during which the first frequency component is not within the first frequency range, (10) maintaining a fourth count of the number of sample periods during which the second frequency component is not within the second frequency range, and (11) using the third and fourth counts to determine whether the detected tone corresponds to a valid CAS tone. The first and second counts are used to determine that the detected tone approximates a valid CAS tone and the third and fourth counts are used to determine that the valid CAS tone has ended. In a particular embodiment, the detected signal will only be determined to correspond to a valid CAS tone if the total of the first and second counts exceeds a first preselected number and either the third count or the fourth count exceeds a second preselected number.

In another particular embodiment, the detected signal is monitored to determine whether the detected signal approximates a CAS tone for a period of time which is longer than otherwise expected for a valid CAS tone (e.g., 75–85 msec). If the detected tone approximates a CAS tone for an extended period of time, it is assumed that the detected signal does not correspond to a valid CAS tone.

Another embodiment of the invention includes a method of determining whether a detected tone corresponds to a valid CAS tone by (1) sampling a first frequency component of the detected tone to determine the time required for the first frequency component to complete a first number of cycles (2) sampling a second frequency component of the detected signal to determine the time required for the second frequency component to complete a second number-of cycles, and (3) selecting the first number of cycles and the second number of cycles such that the time required for the first frequency component to complete the first number of cycles is approximately equal to the time required for the second frequency component to complete the second number of cycles when the detected tone corresponds to a valid CAS tone. In a particular embodiment, the first frequency component is a 2130 hz component which is sampled to determine when 7 cycles of this component have occurred, and the second frequency component is a 2750 hz component which is sampled to determine when 9 cycles of this component have occurred. By selecting these particular numbers of cycles, the sample periods for the first frequency component and the second frequency component are approximately the same. This advantageously allows both components of a valid CAS tone to be detected using sample periods which are approximately the same.

The present invention also includes a circuit for determining when a detected analog tone corresponds to a valid CAS tone. This circuit includes first and second bandpass filters connected to receive the detected tone. The first bandpass filter passes a first analog signal at frequencies approximately equal to the first nominal frequency (e.g., 2130 hz) of a valid CAS tone. The second bandpass filter passes a second analog signal at frequencies approximately equal to the second nominal frequency (e.g., 2750 hz) of a valid CAS tone. The first and second bandpass filters are connected to first and second threshold limiter circuits, respectively, whereby the first and second analog signals are provided to the first and second threshold limiter circuits, respectively. The first and second threshold limiter circuits generate first and second digital signals in response to the first and second analog signals. The first and second threshold limiter circuits are connected to a microprocessor, thereby providing the first and second digital signals to the microprocessor. The microprocessor determines from the first and second digital signals whether the detected tone corresponds to a valid CAS signal. In a particular embodiment, the microprocessor is connected to a DTMF generator, which generates an acknowledge signal when the microprocessor determines that the detected signal corresponds to a valid CAS tone.

The present invention will be more fully understood in light of the following detailed description taken together with the drawings.

BRIEF DESCRIPTION OF THE DRAWINGS

FIGS. 9a–9c are waveform diagrams illustrating speech tones alone and speech tones combined with a valid CAS tone;

DETAILED DESCRIPTION OF THE INVENTION

Figure 1:
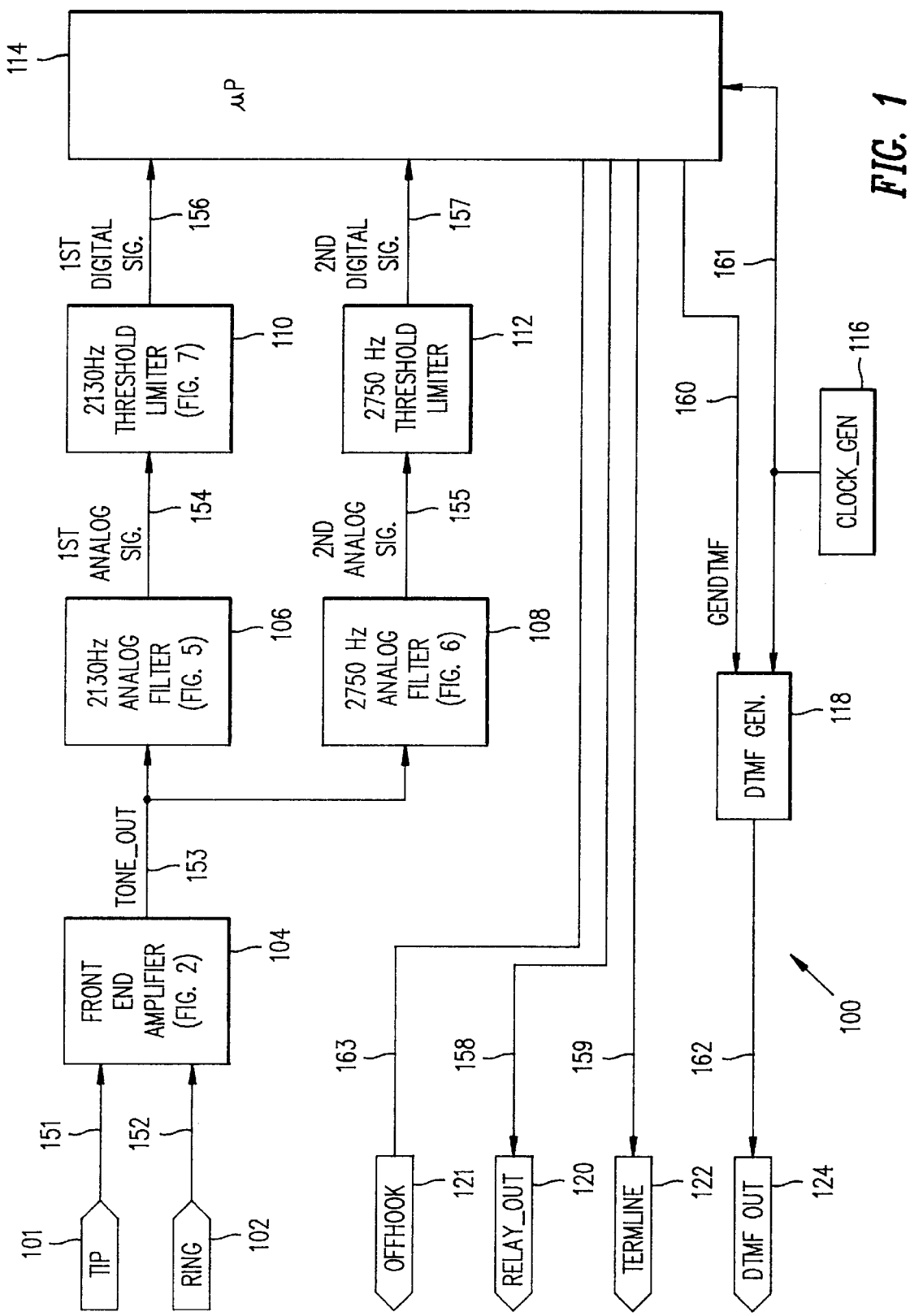
FIG. 1 is a block diagram of a CPE circuit in accordance with one embodiment of the present invention.

FIG. 1 is a block diagram of CPE circuit 100 in accordance with one embodiment of the present invention. CPE circuit includes tip and ring input terminals 101 and 102, front end amplifier 104, 2130 hz analog filter 106, 2130 hz threshold limiter 110, 2750 hz analog filter 108, 2750 hz threshold limiter 112, microprocessor 114, clock signal generator 116, DTMF signal generator 118, RELAY_OUT terminal 120, offhook terminal 121, line terminating output terminal 122 and DTMF signal output terminal 124.

Voice signals, CAS tones, and other conventional telephone system signals are provided to tip and ring terminals 101–102 in accordance with conventional telephony techniques. Tip and ring terminals 101–102 of the telephone system are connected to input terminals of front end amplifier 104 by leads 151 and 152, respectively.

Figure 2A:
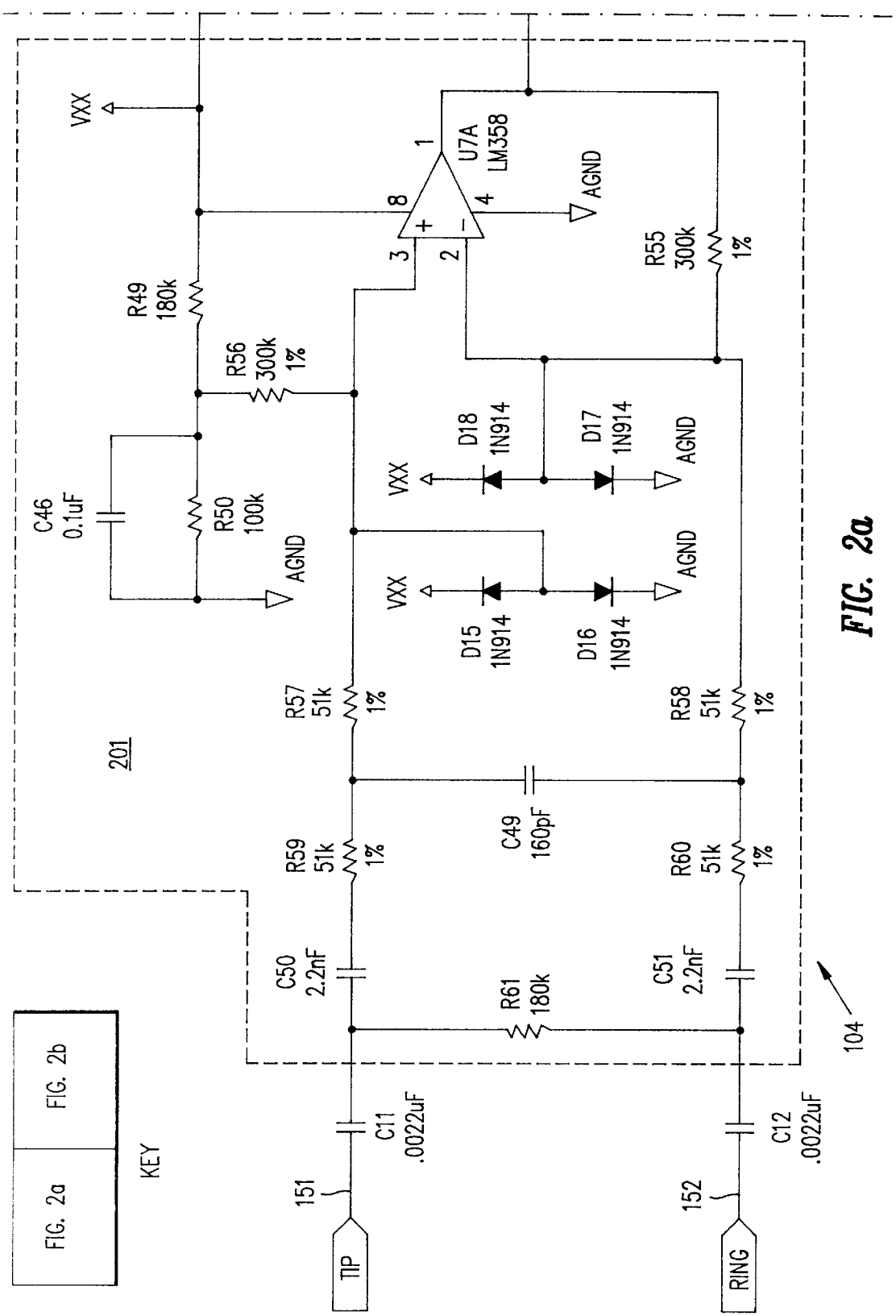
FIG. 2, which consists of FIGS. 2a and 2b, is a schematic diagram of a front end amplifier.
Figure 2B:
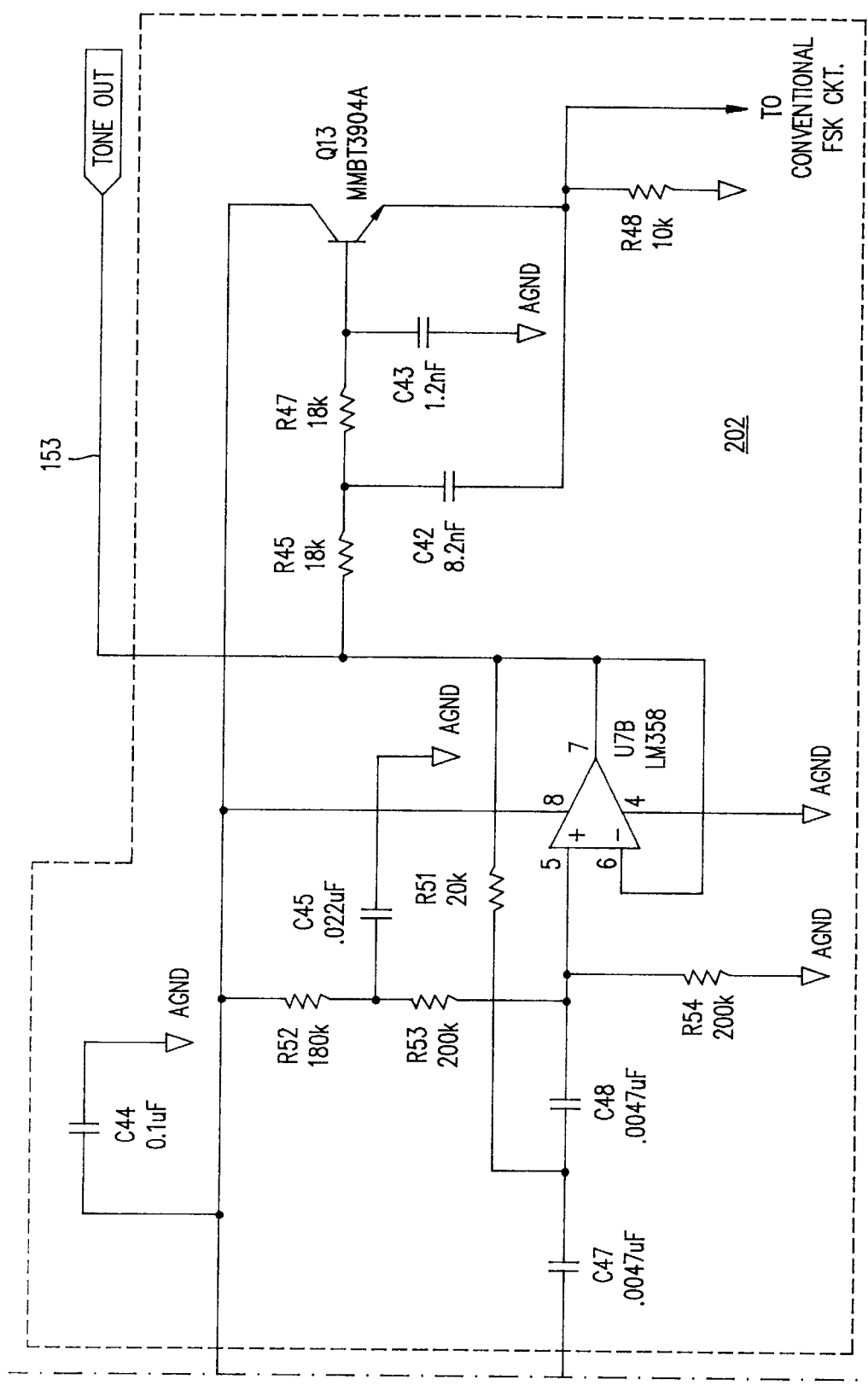

FIG. 2, which consists of FIGS. 2a and 2b, is a schematic diagram of front end amplifier 104 in accordance with one embodiment of the present invention. Front end amplifier 104 is a conventional circuit which includes high voltage capacitors C11 and C12 to isolate the rest of CPE circuit 100 from high voltages on the telephone system. Front end amplifier 104 also includes a conventional Chebyshev filter 201 which is formed by capacitors C46, and C49–C51, resistors R49–R50 and R55–R61, diodes D15–D18 and operational amplifier U7A as illustrated. Additionally, front end amplifier 104 includes a conventional buffer isolator circuit 202 which includes resistors R45, R47, R48, and R51–R54, capacitors C42–C45, C47 and C48, bipolar transistor Q13 and operational amplifier U7B, as illustrated. Front end amplifier 104 combines the balanced signals received at tip and ring terminals 101–102, thereby creating a single-ended signal which is representative of the signals received on tip and ring terminals 101–102. This single-ended signal is amplified and buffered to create a TONE_OUT signal.

Figure 3:
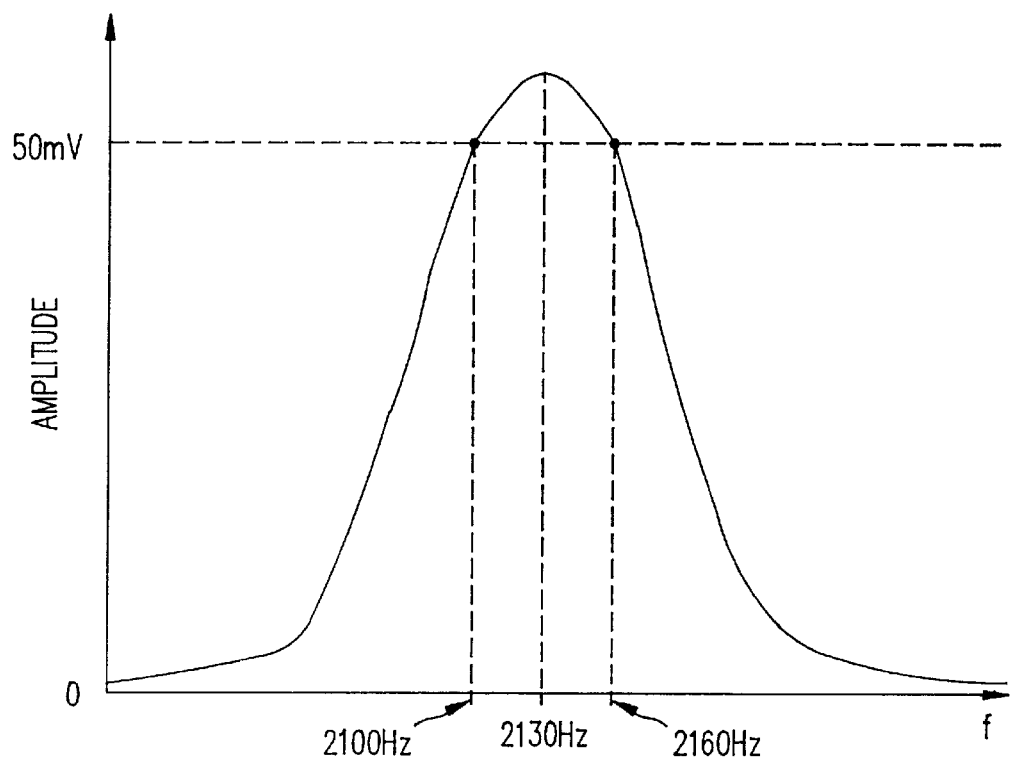
FIGS. 3 and 4 are schematic diagrams illustrating the frequency response of analog filters used in one embodiment of the invention.
Figure 4:
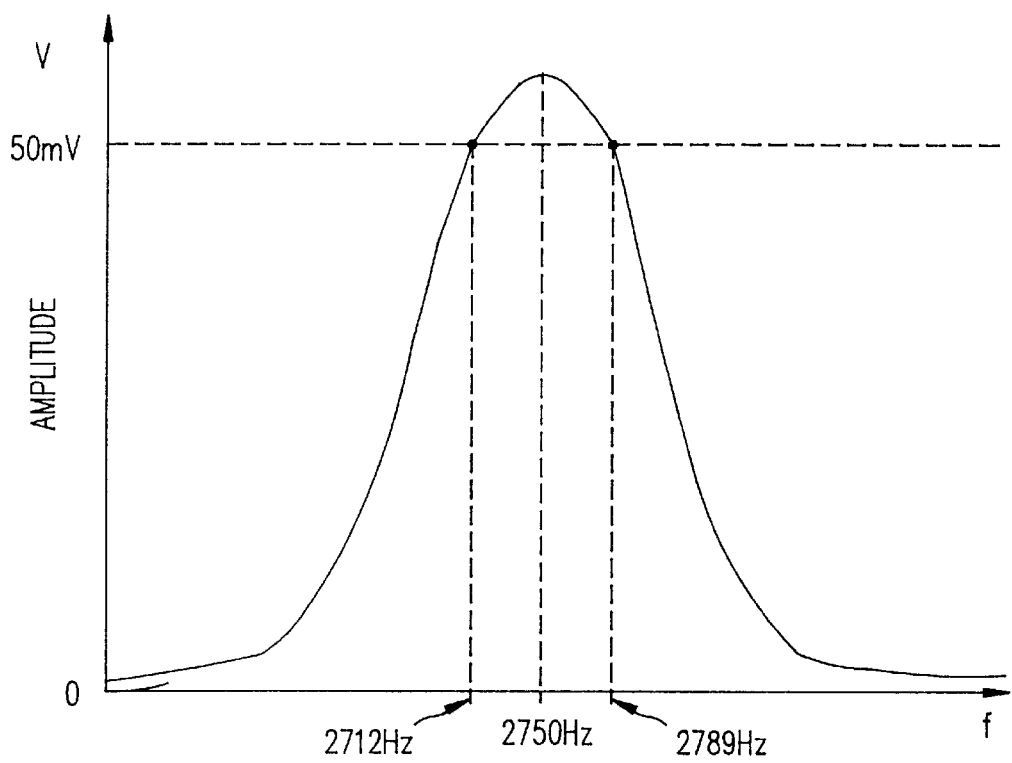

The TONE_OUT signal is provided to input terminals of both 2130 hz analog filter 106 and 2750 hz analog filter 108 on lead 153 (FIG. 1). Analog filters 106 and 108 are narrow bandpass filters. In general, analog filter 106 passes signals which have frequencies near 2130 hz and analog filter 108 passes signals which have frequencies near 2750 hz. FIGS. 3 and 4 are schematic diagrams illustrating the frequency response of analog filter 106 and analog filter 108, respectively.

As illustrated in FIG. 3, analog filter 106 will pass signals in the range of 2100–2160 hz at an amplitude of 50 mV or greater. This frequency range represents a center frequency of 2130 hz±1.4%. Signals outside of the predetermined frequency range are greatly attenuated. As discussed in more detail below, it is undesirable for signals outside of this predetermined frequency range to have amplitudes exceeding 50 mV.

As illustrated in FIG. 4, analog filter 108 will pass signals in the range of 2712–2789 hz at an amplitude of 50 mV or greater. This frequency range represents a center frequency of 2750 hz±1.4%. Again, signals outside of the predetermined frequency range are greatly attenuated.

Figure 5A:
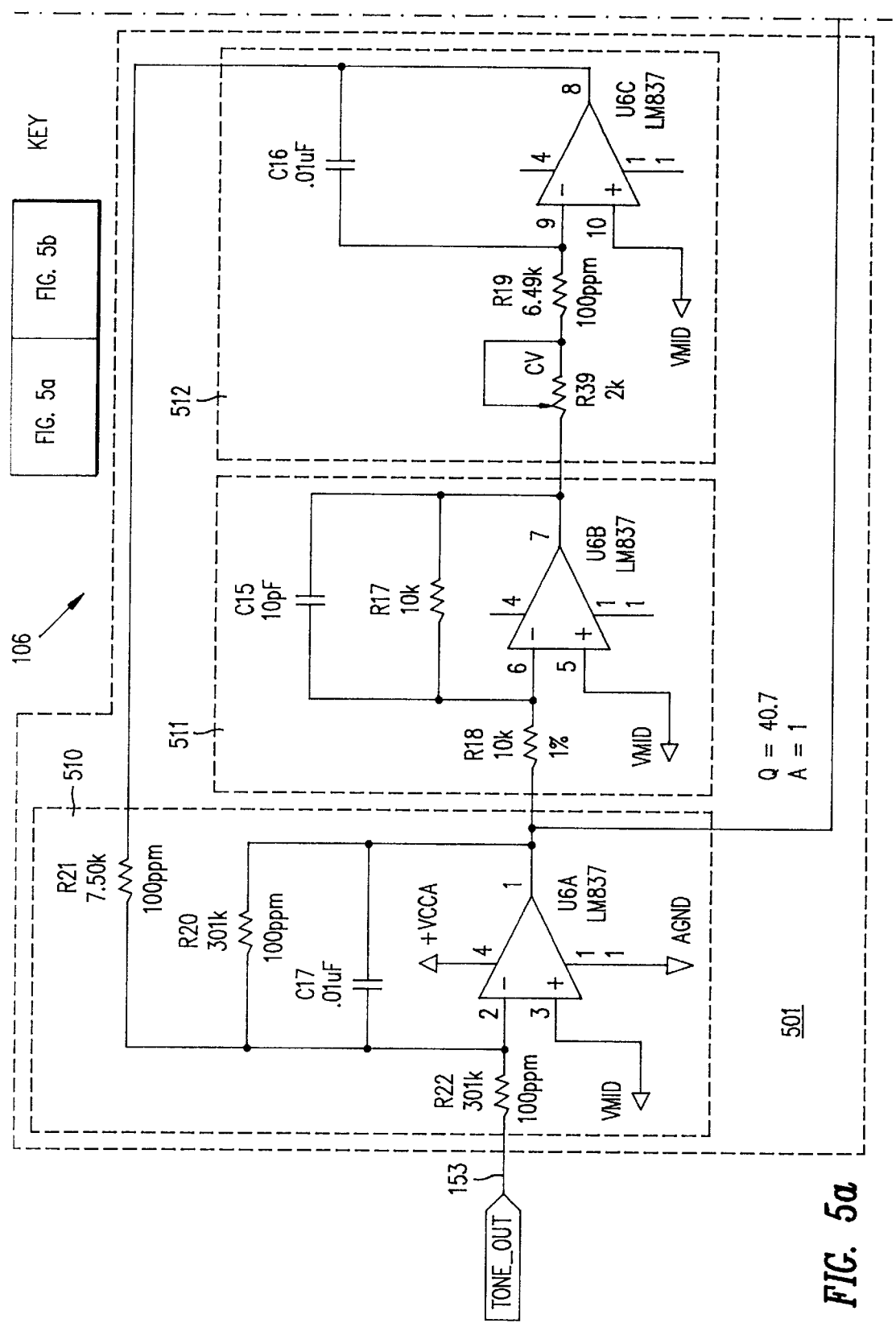
FIG. 5, which consists of FIGS. 5a and 5b, and FIG. 6 are schematic diagrams of 2130 hz and 2750 hz analog filters in accordance with one embodiment of the invention.
Figure 5B:
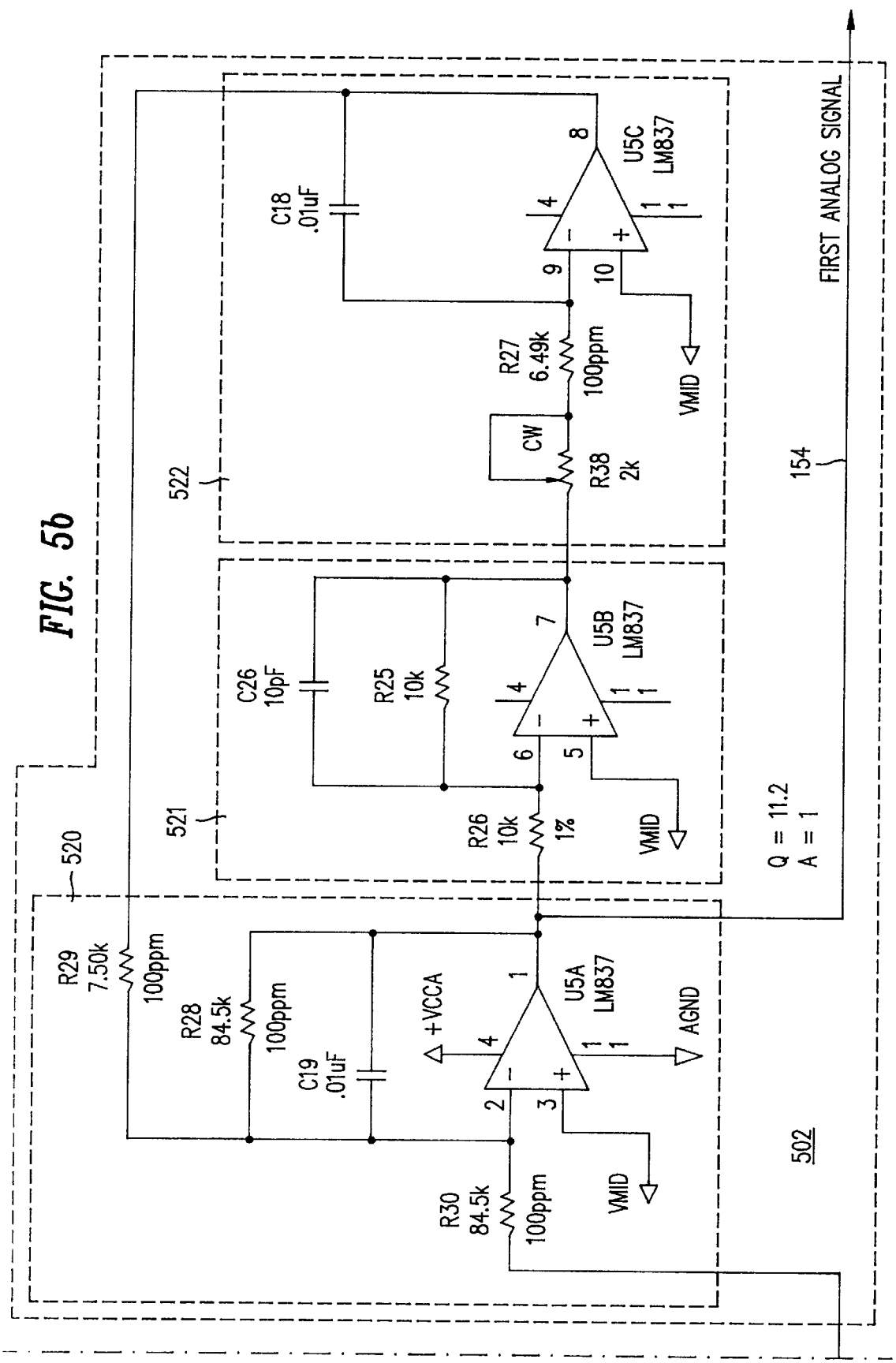

FIG. 5, which consists of FIGS. 5a and 5b, is a schematic diagram of 2130 hz analog filter 106 in accordance with one embodiment of the invention. Analog filter 106 includes two conventional bi-quad filters 501 and 502 which are tuned to give the frequency response illustrated in FIG. 3. Two bi-quad filters 501 and 502 are used to improve the stop band attenuation of analog filter 106. It is desirable to improve the stop band attenuation of analog filter 106 because the human voice band frequency is relatively close (approximately 1500 hz) to the frequencies to be passed by analog filter 106.

Bi-quad filter 501 includes adjustable phase shifter 510, inverter 511 and 90° phase shifter 512. Adjustable phase shifter 510 includes resistors R20–R22, capacitor C17 and operational amplifier U6A. Inverter 511 includes resistors R17–R18, capacitor C15 and operational amplifier U6B. Phase shifter 512 includes resistors R19 and R39, capacitor C16 and operational amplifier U6C. The elements of bi-quad filter 501 are selected such that filter 501 has a figure of merit Q of 40.7 and an amplification factor of 1.

Similarly, bi-quad filter 502 includes adjustable phase shifter 520, inverter 521 and 90° phase shifter 522. Adjustable phase shifter 520 includes resistors R28–R30, capacitor C19 and operational amplifier U5A. Inverter 521 includes resistors R25–R26, capacitor C26 and operational amplifier U5B. Phase shifter 522 includes resistors R27 and R38, capacitor C18 and, operational amplifier U5C. The elements of bi-quad filter 502 are selected such that filter 502 has a figure of merit Q of 11.2 and an amplification factor of 1. The output signal created by analog filter 106 is referred to as the first analog signal. The first analog signal is transmitted on lead 154.

Figure 6:
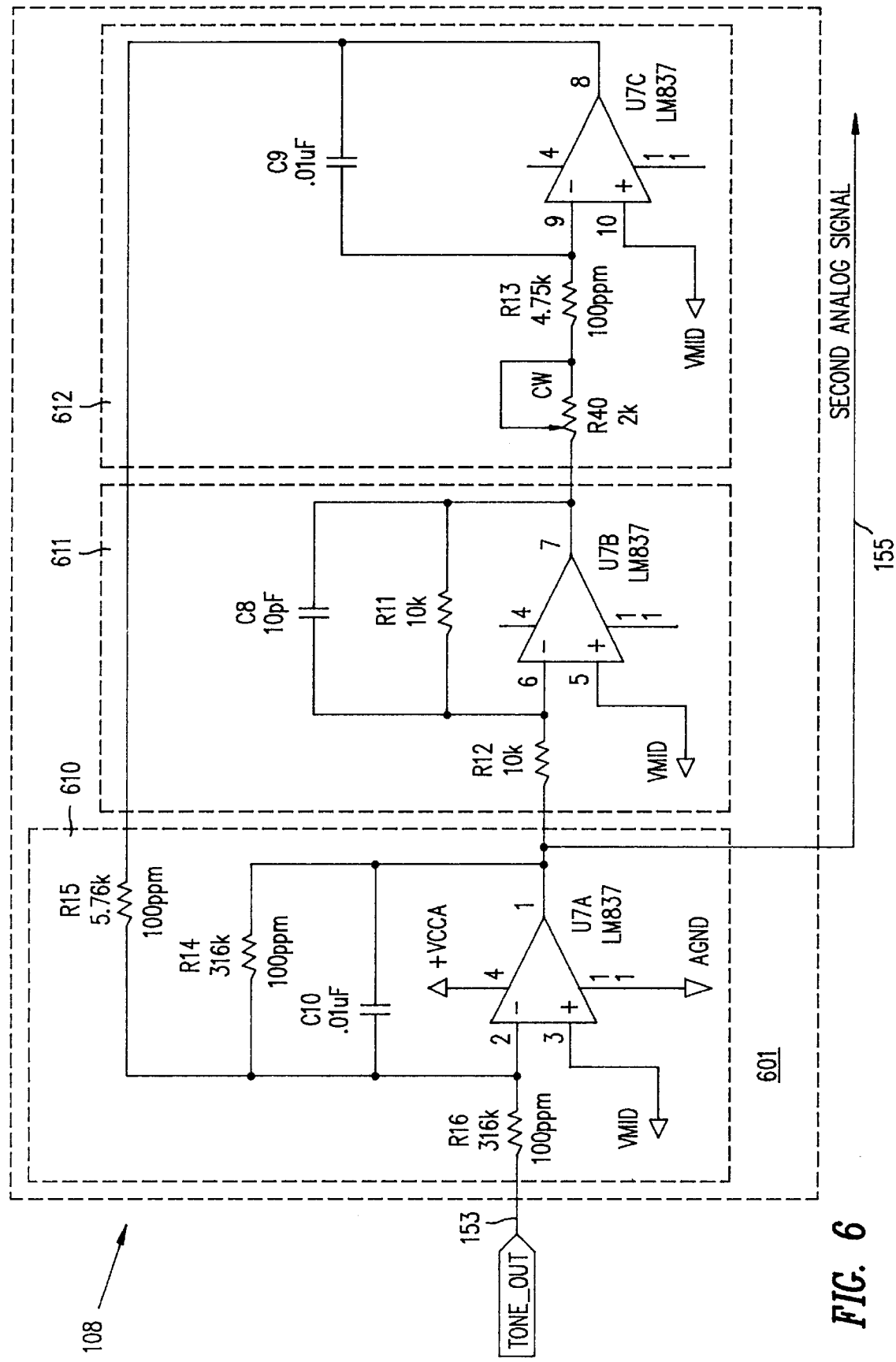

FIG. 6 is a schematic diagram of 2750 hz analog filter 108 in accordance with one embodiment of the invention. Analog filter 108 is a conventional bi-quad filter 601 which is tuned to give the frequency response illustrated in FIG. 4. Only one bi-quad filter 601 is used in this embodiment because the frequencies of the signals to be passed by filter 108 (e.g., 2712 hz to 2789 hz) are relatively far from the normal human voice band frequencies.

Bi-quad filter 601 is similar to bi-quad filters 501 and 502 (FIG. 5), and therefore includes adjustable phase shifter 610, inverter 611 and 90° phase shifter 612. Adjustable phase shifter 610 includes resistors R14–R16, capacitor C10 and operational amplifier U7A. Inverter 611 includes resistors R11–R12, capacitor C8 and operational amplifier U7B. Phase shifter 612 includes resistors R13 and R40, capacitor C9 and operational amplifier U7C. The elements of bi-quad filter 601 are selected such that filter 601 has a figure of merit Q of 55 and an amplification factor of 1. The output signal created by filter 108 is referred to as the second analog signal. The second analog signal is transmitted on lead 155.

Although analog filters 106 and 108 of the described embodiment have frequency ranges which are ±1.4% of the frequencies to be detected, other ranges are possible and within the scope of the invention. To achieve other ranges, the elements of bi-quad filters 501, 502 (FIG. 5) and 601 (FIG. 6) are appropriately selected and/or adjusted.

Figure 7:
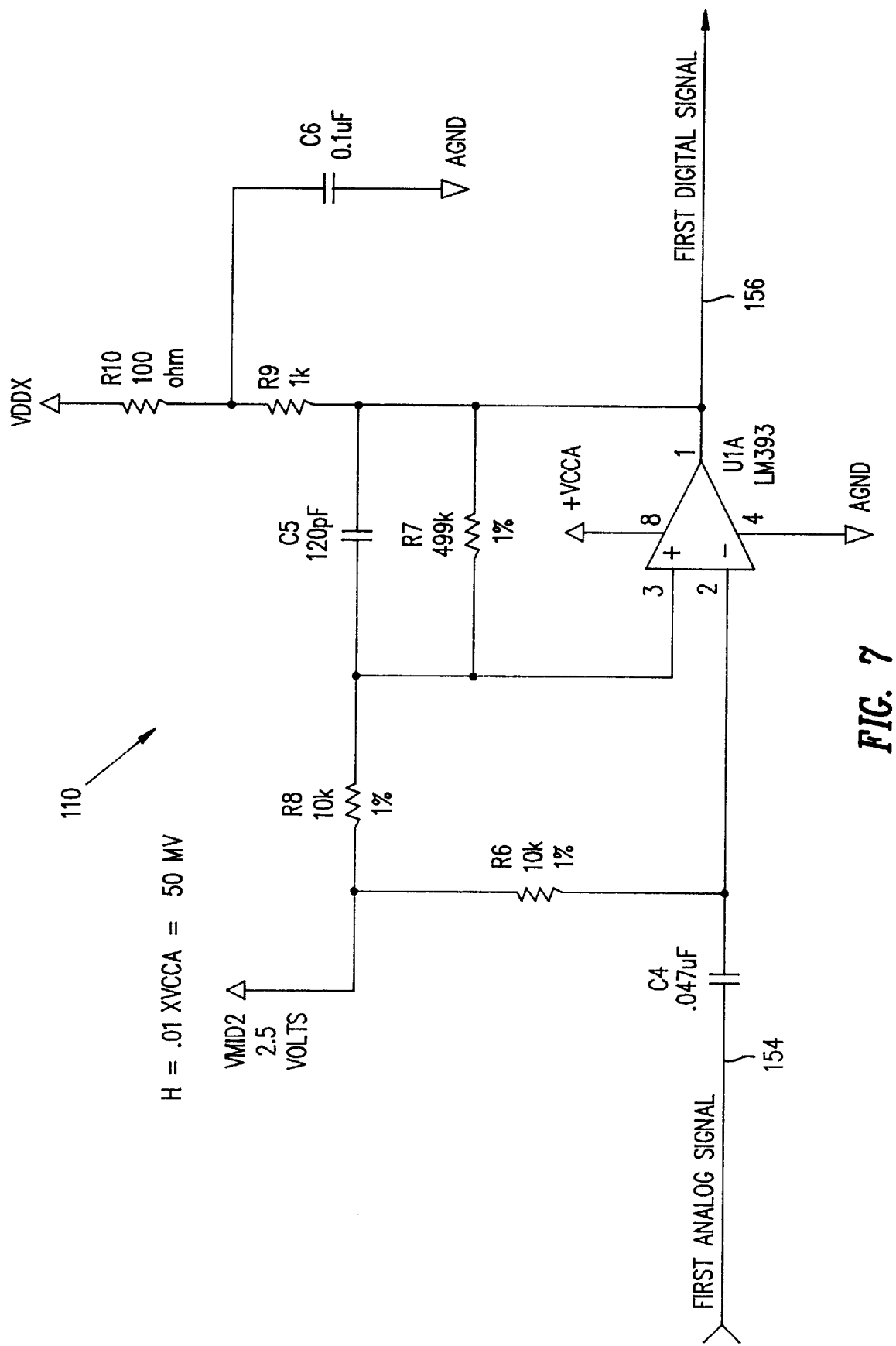
FIG. 7 is a schematic diagram illustrating a threshold limiter circuit in accordance with one embodiment of the invention.

The output signals passed by analog filters 106 and 108 are applied to the input terminals of threshold limiter circuits 110 and 112, respectively (FIG. 1). FIG. 7 is a schematic diagram illustrating threshold limiter circuit 110. In the embodiment described, threshold limiter circuit 112 is identical to threshold limiter circuit 110, although this is not necessary.

Threshold limiter circuit 110 includes resistors R6–R10, capacitors C4–C6 and operational amplifier U1A. The inverting input terminal of operational amplifier U1A is connected to receive the first analog signal through capacitor C4. This inverting input terminal is also connected to a fixed voltage source of 2.5 volts through 10 kΩ resistor R6. Thus, the voltage applied to the inverting input terminal of operational amplifier U1A is equal to 2.5 volts plus the voltage of the first analog signal.

The non-inverting input terminal of operational amplifier U1A is connected to the fixed voltage source of 2.5 volts through 10 kΩ resistor R8. The non-inverting input terminal of operational amplifier U1A is also connected to the output terminal of operational amplifier U1A through the parallel combination of 499 kΩ resistor R7 and 120 pF capacitor C5, which speeds up the response time of the switching.

Operational amplifier U1A is connected to power supply terminals +VCCA and AGND. The +VCCA terminal is held at 5 volts and the AGND terminal is held at 0 volts. The voltage at the output terminal of operational amplifier U1A is therefore capable of operating between 5 volts and 0 volts.

The first analog signal received from analog filter 106 controls the operation of threshold limiter circuit 110. The values of the elements of threshold limiter circuit 110 are selected such that the voltage provided at the inverting input terminal of operational amplifier U1A must be less than or equal to 2.45 volts to cause the voltage on the output terminal of operational amplifier U1A to transition to 0 volts. This will occur when the first analog signal is less than or equal to −50 mV (2.5 volts−50 mV=2.45 volts).

Similarly, the values of the elements of threshold limiter circuit 110 are selected such that the voltage provided at the inverting input terminal of operational amplifier U1A must be greater than or equal to 2.55 volts to cause the voltage on the output terminal of operational amplifier U1A to transition to 5 volts. This will occur when the first analog signal is greater than or equal to 50 mV (2.5 volts+50 mV=2.55 volts).

Figure 8:
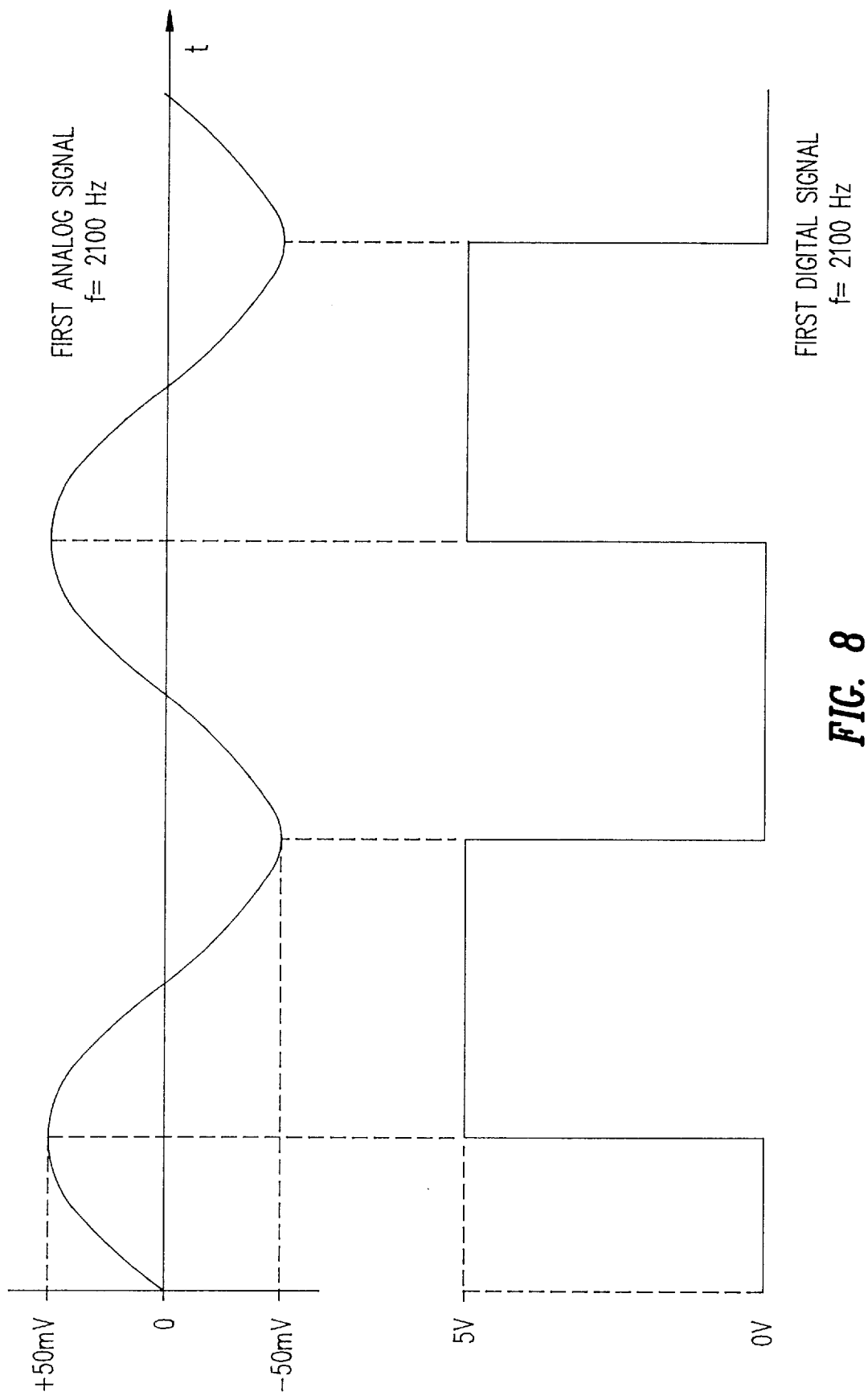
FIG. 8 is a waveform diagram illustrating the response of the threshold limiter of FIG. 7 to a particular analog signal.

In the foregoing manner, the analog signal applied to the inverting input terminal of operational amplifier U1A is converted a first digital signal having voltage levels which correspond to TTL voltage levels (i.e., 0 and 5 volts). The first digital signal provided by threshold limiter circuit 110 will have frequencies in the range of 2100–2160 hz, since these are the only frequencies at which the first analog signal has amplitudes greater than or equal to 50 mV. FIG. 8 is a waveform diagram illustrating the response of threshold limiter 110 to a first analog signal having a frequency of 2100 hz and a peak amplitude of 50 mV.

Threshold limiter circuit 112 operates in a manner similar to threshold limiter circuit 110 to provide a second digital signal which varies between 0 and 5 volts and is generated in response to the second analog signal. The second digital signal exhibits frequencies in the range of 2712–2789 hz.

The digital signals generated by threshold limiters 110 and 112, (i.e., the first and second digital signals, respectively), are applied to input terminals of microprocessor 114 via leads 156 and 157, respectively (FIG. 1). Microprocessor 114 is a conventional device available from Philips as part number S87C51FA-4A44. Microprocessor 114 also receives a clock signal having a frequency of 3.5795 Mhz from conventional clock signal generation circuit 116. The 3.5795 Mhz clock signal is divided by four within microprocessor 114 to create an internal counter clock (CNTRCLK) signal having a frequency of 894.875 khz. The CNTRCLK signal is used to clock a free-running 16-bit counter within microprocessor 114.

Microprocessor 114 is programmed to process the incoming signals in the manner described below to determine whether the first and second digital signals are representative of a CAS tone. Appendix A includes the source code used to program microprocessor 114 in accordance with the embodiment of the invention described below.

Microprocessor 114 is capable of detecting the rising edges of the first and second digital signals. Microprocessor 114 monitors the first and second digital signals for rising edges. Upon detecting a rising edge in either of these digital signals, microprocessor 114 transfers the contents of the free running counter to a capture register and then issues an interrupt.

Inside the interrupt service routine, if the rising edge detected represents an "initial" rising edge of the first or second digital signal, the count stored in the capture register is written to memory. The count at the time that the initial rising edge of the first digital signal is detected will be referred to as 2130__Count__0, and the count at the time that the initial rising edge of the second digital signal is detected will be referred to as 2750__Count__0.

Also within the interrupt service routine, if the rising edge detected represents the seventh rising edge of the first digital signal or the ninth rising edge of the second digital signal, an appropriate flag is set (CAPT0 or CAPT1), and the contents of the capture register are written to memory within microprocessor 114. The count at the time that the seventh rising edge of the first digital signal is detected will be referred to as 2130__Count__7, and the count at the time that the ninth rising edge of the second digital signal is detected will be referred to as 2750__Count__9.

Seven rising edges (i.e., seven cycles) of the first digital signal define a sample period of the first digital signal. This sample period varies based on the time which elapses between the first rising edge and the seventh rising edge of the first digital signal. For a valid CAS tone, which will have a first digital signal having a frequency in the range of 2100–2160 hz, the sample period will be in the range of 3.241 to 3.333 msec. The sample period can also be defined in terms of the number of cycles of the CNTRCLK signal which elapse during the sample period. Thus, a valid CAS tone will have a sample period in the range of 2900 to 2983 counts. The sample period of the first digital signal (in counts) is calculated as 2130__Count__7 minus 2130__Count__0.

Nine rising edges (i.e., nine cycles) of the second digital signal define a sample period of the second digital signal. This sample period varies based on the time which elapses between the first and ninth rising edges of the second digital signal. For a valid CAS tone, which will produce a second digital signal having a frequency in the range of 2712–2789 hz, the sample period will be in the range of 3.227 to 3.319 msec (or in the range of 2888 to 2970 cycles of the CNTRCLK signal). The sample period of the second digital signal (in counts) is calculated as 2750__Count__9 minus 2750__Count__0.

The sample periods are selected to be seven cycles for the first digital signal and nine cycles for the second digital signal to make the sample period for the two digital signals approximately the same during a valid CAS tone.

The divide factors must be carefully selected to maintain a very close phase relationship between the incoming signals at the sampling points. If this phase relationship is not maintained, some portion of the signal at the opposite frequency will come through the filter and interfere with the intended signal. If the phase relationship at the sample point is the same, the effects of interference are canceled (or nulled).

Two additional timers are used to determine if enough time has elapsed such that the seventh cycle of the first digital signal or the ninth cycle of the second digital signal should have been detected but was not detected. These timers have built in timeout flags that can be read by the main program, so that no interrupt is necessary. When the main program detects that one of the timeout flags is set, an invalid sample period value FF is entered into a counter history. In one embodiment, these timers are set to expire after 3200 counts, approximately 7% longer than the time required to detect a valid CAS frequency.

A count of successive invalid samples is kept for each of the first and second digital signals in separate tone__off counters. As described in more detail below, the tone off counter is reset when a valid sample period meets a stricter frequency requirement.

The last 28 sample periods of each digital signal are stored in corresponding counter history memories. Each counter history consists of 28 memory positions, each memory position having 8-bits.

The sample period of each digital signal is compared with the predetermined valid count range for the corresponding digital signal. For example, the sample period of the second digital signal (i.e., 2750__Count__9 minus 2750__Count__0) may be 2915 counts. Such a sample period would represent a valid sample, since this sample period falls within the predetermined range of 2900 to 2983 counts for the second digital signal. Conversely, a sample period of the second digital signal having 2850 counts would be an invalid sample period. Again, invalid sample periods are stored as an invalid symbol FF in the corresponding counter history.

Valid sample periods are also stored in the counter history. Rather than store the entire number representing the valid sample period, the number of counts by which the valid sample period exceeds the number of counts of the minimum valid sample period is calculated and stored. For example, if the first signal has a valid sample period of 2915 counts, the value stored in the counter history is equal to 2915 minus 2900, or 15. This allows the valid sample periods to be stored using 8-bit values.

A count of the number of valid samples periods stored in the 28 byte counter history is also maintained. This count is referred to as the total__tone count. The total__tone count is incremented each time a valid sample period is detected.

As the sample periods (both valid and invalid) are accumulated in the counter history, a sum of the valid sample periods is maintained. This sum is referred to as the frequency sum.

Sample periods (both valid and invalid) are written to the counter history in a rotating basis, such that the oldest sample period is replaced with the newest sample period.

The difference between successive valid sample periods is also calculated. A difference between successive valid sample periods indicates a frequency deviation between the two sample periods. Two successive valid sample periods is defined as a span. For example, if a first valid sample period has 2915 counts, and a second valid sample period has 2920 counts, the difference of the first span is −5 counts (2915–2920). The direction of the frequency change is defined as being negative, because the frequency decreased during the first span. Both the change of frequency (e.g., 5) and the direction of frequency change (e.g., negative) for the first span are stored in memory.

For each new span, the change of frequency and the direction of frequency change are calculated. The direction of frequency change for the current span is compared to the direction of frequency change of the previous span. If the directions associated with successive spans are different, a transition counter is incremented. The transition counter thereby indicates the number of times that the direction of the frequency changes between successive spans. Continuing the current example, if a third valid sample period has 2926 counts, the change of frequency associated with the second span is −6 counts (2920–2926), and the direction of frequency change is negative. In this example, there is no change in the direction of frequency change between the successive spans because both spans have a negative direction of frequency change. Thus, the transition counter is not incremented.

If the third valid sample period has 2914 counts, the change of frequency of the second span is +6 counts (2920–2914) and the direction of the frequency change is positive. Consequently, there is a change in frequency direction between the successive spans. In this case, the transition counter is incremented.

The number of times that the frequency changes direction is used to determine whether the detected tone is a CAS tone, a CAS tone combined with human speech, or human speech.

If the detected tone is a CAS tone modified by speech, the detected tone will typically contain many changes in the frequency directions between successive spans.

If the detected tone is caused by human speech only, the detected tone will typically undergo fewer changes in frequency direction between successive spans. Consequently, the higher the count of the transition counter, the higher the probability that a CAS tone is present.

If the detected tone is caused by a CAS tone only, spans may exhibit changes of frequency equal to 0, because the frequency of the CAS tone by itself is virtually constant. Because it is desirable to treat a CAS tone in the same manner as a CAS tone in the presence of human speech, a span having a no change of frequency automatically causes the transition counter to be incremented. Thus, a perfect CAS tone would have 24 sample periods, 23 spans and 22 changes in frequency direction.

Figure 9C:
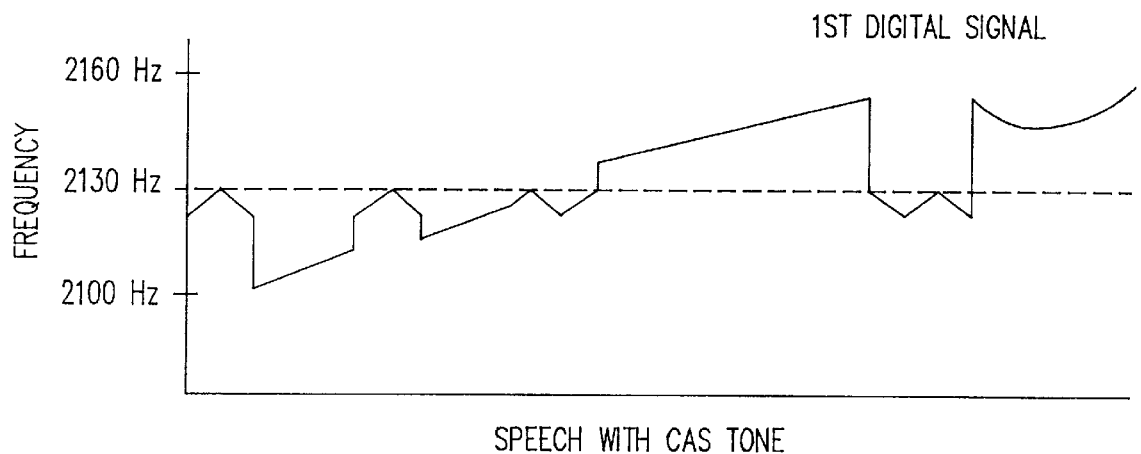

FIGS. 9a–9c illustrate this point. FIG. 9a illustrates the amplitude of a first analog signal caused by speech alone. As seen in FIG. 9b, when this first analog signal of FIG. 9a is converted to a first digital signal, this first digital signal only changes frequency direction twice. FIG. 9c illustrates the first digital signal of FIG. 9b in the presence of a CAS tone. The first digital signal of FIG. 9c undergoes 14 changes in frequency direction.

A count (designated the continuity count) of consecutive valid spans is maintained in a continuity counter. A sum (designated the continuity sum) of the changes of frequency of the valid spans is also maintained.

Each valid sample period is then re-evaluated using a second frequency range. In one embodiment of the present invention, this second frequency range varies from the nominal frequencies by ±0.6%. Thus, the second frequency range used for the first digital signal is 2117 to 2143 hz. The second frequency range used for the second digital signal is 2734 to 2767 hz. In other embodiments, other values can be used for the second frequency ranges. If the valid sample period is within its associated second frequency range, the sample period is considered a "hit". For each digital signal, the number of hits for the last 24 sample periods are counted. A tone1_counter stores the number of hits for the first digital signal and a tone2_counter stores the number of hits for the second digital signal (See, e.g., FIG. 14). A detected hit will reset the count of the tone_off counter.

Each time a new sample period is detected, the tone_counters (i.e., the tone1_counter and the tone2_counter) and tone_off counters associated with the first and second digital signals are examined. When both of the tone_counters contain 14 or more hits, and at least one of the tone_off counters reach 2 or more, it is determined whether the values currently stored in the various registers, counters and memory locations are representative of a CAS tone. It is assumed that when both of the tone_counter registers reach 14 or more, there is a fair probability that a CAS tone caused this condition. It is also assumed that when at least one of the tone_off counters reach 2 or more, there is a high probability that a received CAS tone has ended; and that it may be time to generate an acknowledge signal.

Thus, if the foregoing conditions are met, processing continues as follows. First, the contents of the two transition counters are added to determine the total number of times that the frequency changed direction for the two digital signals. If this total is less than 19, it is assumed that the present conditions were caused by a human voice alone. In such circumstances, the confirmation of a CAS tone is delayed at least until the next sample period.

If the total count of the two transition counters is greater than or equal to 19, there is a high probability that the present conditions were caused by a valid CAS tone, and processing proceeds as described below.

The contents of the two total_tone counters are then examined. If the either total_tone counter has a count of 26 or more (indicating that 26 or more of the past 28 sample periods were valid), it is assumed that the present state was not caused by a CAS tone. This is because a valid CAS tone (which is only 75–85 msec in duration) will not last as long as 26 sample periods. Thus, under these conditions the confirmation of a CAS tone is delayed at least until the next sample period. If both total_tone counters have counts less than 26, processing proceeds as described below.

The continuity sum (i.e., the sum of the changes of frequency for all of the spans) is divided by the continuity count (i.e., the total number of valid spans), thereby giving an average frequency deviation of the incoming digital signal. The average frequency deviation is rounded down to the nearest integer. A low average frequency deviation indicates a stable digital signal. If the average frequency deviation is less than 8 counts, the count of the corresponding tone_counter (i.e., tone1_counter or tone2_counter) is incremented by an integer value equal to eight minus the average frequency deviation. As described in more detail below, a higher tone_counter content widens the frequency range at which a valid CAS tone will be confirmed.

Figure 10:
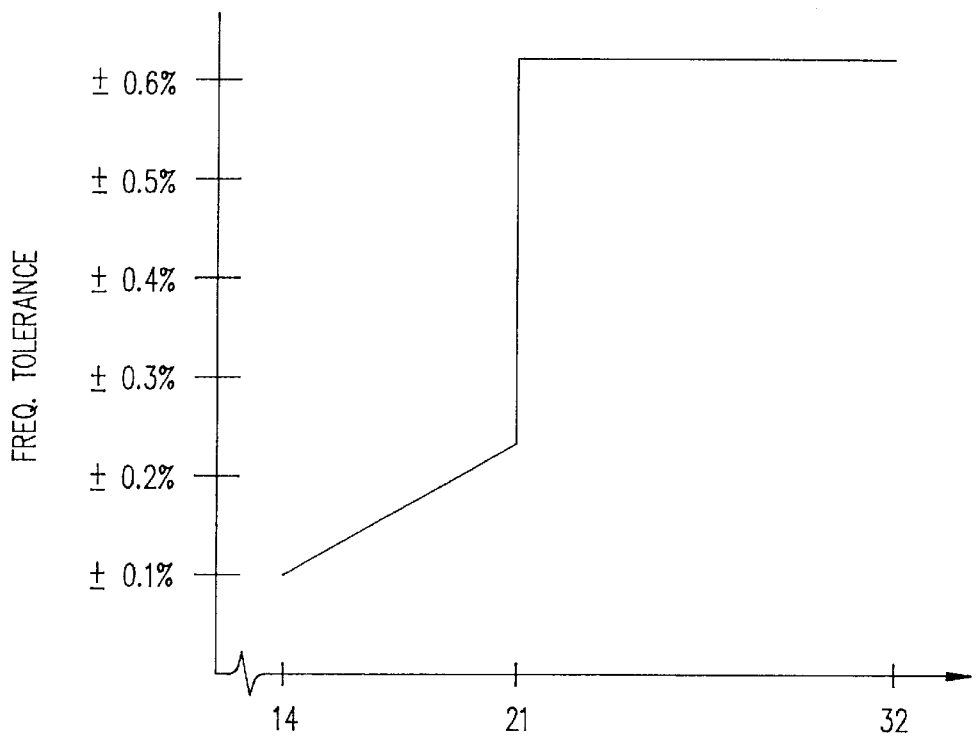
FIG. 10 illustrates frequency tolerance vs. tone_count for one embodiment of the invention.

The average frequency of each incoming digital signal is then calculated by dividing the frequency sum by the total_tone count. The average frequency must fall within one of a plurality of predefined frequency ranges for a CAS tone to be confirmed. The particular predefined range is retrieved from a look up table based on the contents of the tone_counter register. The lower the contents of the tone_counter register, the closer the average frequency must be to the nominal frequency to qualify as a CAS tone. The higher the contents of the tone_counter register, the farther the average frequency can vary and still qualify as a CAS tone. FIG. 10 illustrates the frequency tolerance vs. tone_count for one embodiment of the invention. In this embodiment, for confirmation of a CAS tone, the average frequency can only vary ±0.1% from the nominal frequency if the tone_count is 14. This frequency tolerance then increases linearly to ±0.225% if the tone_count is 21. For tone_counts greater than 21, the average frequency can vary ±0.6% from the nominal frequency. These frequency ranges are dictated by an application requirement of 0.5% for the frequency tolerance of the incoming CAS tones. The predefined frequency ranges can be modified by the limits required by the particular application.

If all of the above referenced tests are met, a valid CAS tone is assumed to exist. If these tests are not met, the confirmation of a CAS tone is delayed at least until the next sample period.

Upon confirming a valid CAS tone, microprocessor 114 generates a RELAY_OUT signal on lead 158 which is used to determine whether another telephone extension on the customer's system is off hook. If another telephone extension is off hook, it is not possible to receive the caller ID information. The RELAY_OUT signal causes the customer's telephone to disconnect from the telephone system for a short period of time (typically 20 msec). The voltage on the system is measured during this time. If the voltage rises rapidly, there is not another telephone extension which is off hook, and the customer is able to receive the caller ID information. An OFFHOOK signal is generated by external circuitry and provided to microprocessor 114 on lead 163, thereby informing microprocessor 114 of the detected status of the other telephone extensions.

Microprocessor 114 then generates a TERMLINE signal on lead 159 which is used to terminate the customer's telephone line by applying a DC load to the phone line which approximates a typical telephone load.

Microprocessor 114 then transmits a GENDTMF signal to DTMF generator 118 on lead 160 (FIG. 1). In response, DTMF generator 118 generates the acknowledge signal on lead 162 (i.e., the DTMF signal "D"), which in turn is transmitted to the telephone company central office. Upon receiving the acknowledge signal, the telephone company will transmit the caller ID information to the customer. DTMF generator 118 is a conventional device available from UMC Microelectronics as part number 91531/A.

Figure 11A:
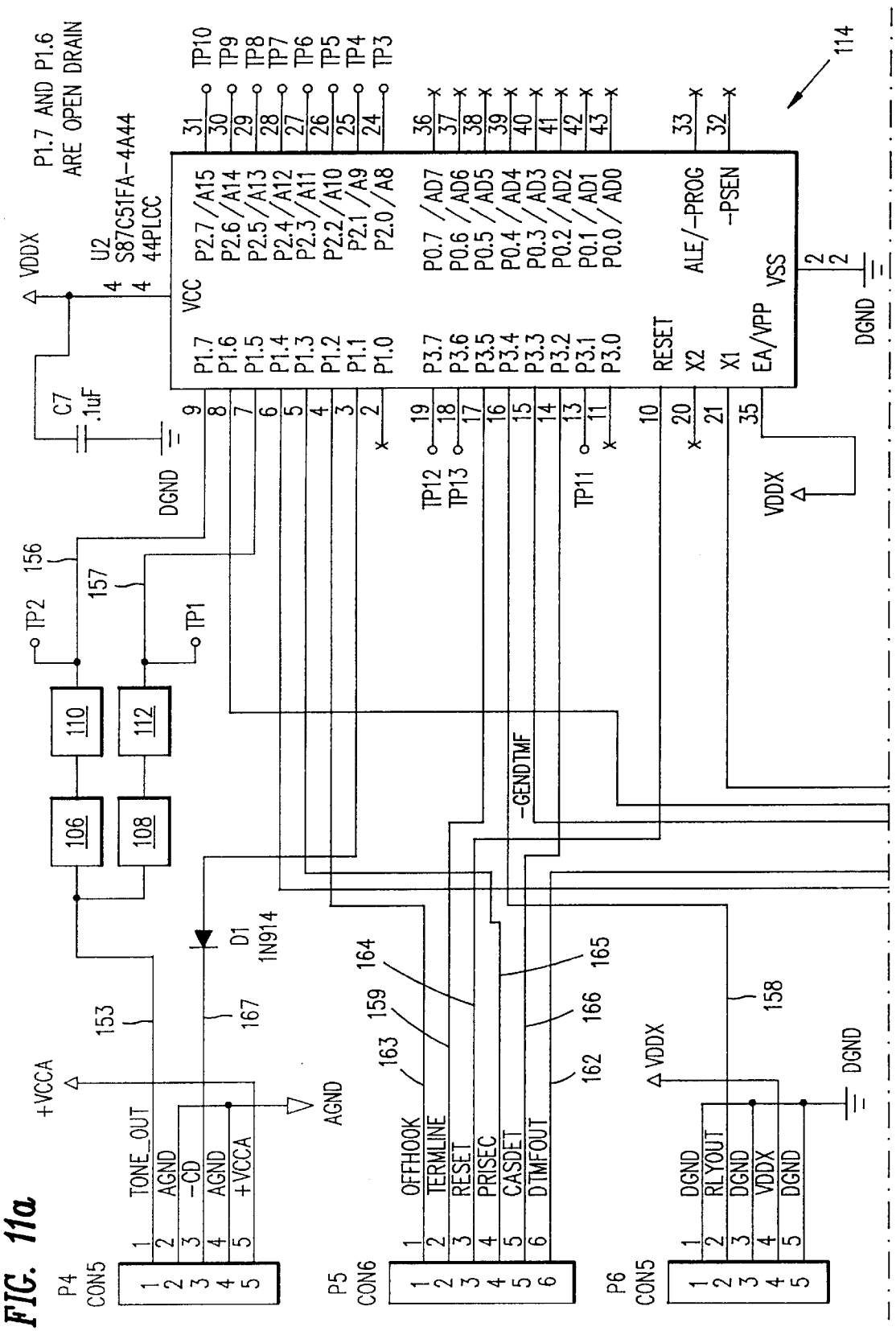
FIG. 11, which consists of FIGS. 11a and 11b, is a schematic diagram which illustrates a portion of the CPE circuit of FIG. 1 in additional detail.
Figure 11B:
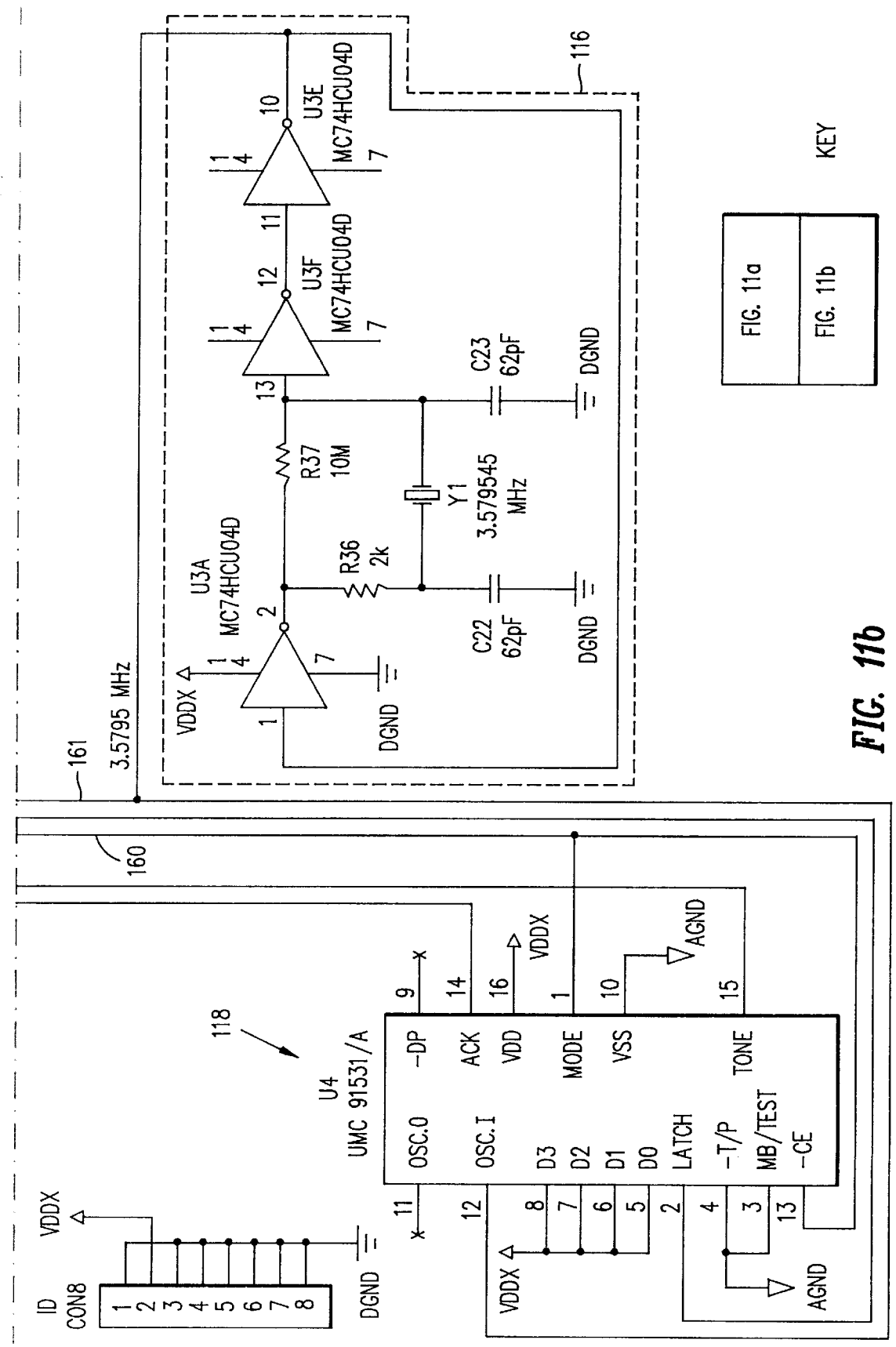

FIG. 11, which consists of FIGS. 11a and 11b is a schematic diagram which illustrates filters 106 and 108, threshold limiters 110 and 112, microprocessor 114, clock generation circuit 116 and DTMF generator 118 in additional detail. In addition to the previously described signals, microprocessor 114 generates a CAS tone detect (CASDET) signal, and receives a carrier detect (−CD), a RESET signal, and a primary/secondary (PRISEC) signal. The −CD signal is a conventional carrier detect signal received on lead 167 which informs microprocessor 114 that a strong telephone company signal is being received by CPE circuit 100. The RESET signal is a conventional signal received on lead 164 which used to reset microprocessor 114. The PRISEC signal, which is received from external circuitry on lead 165, is used to determine whether or not CPE circuit 100 is enabled to generate an acknowledge tone in response to a detected CAS tone. The CASDET signal, transmitted on lead 166, is a signal generated by microprocessor 114 that indicates a valid CAS tone was detected. These signals are used to assist external circuitry to receive caller ID information from the central office. The above described signals, as well as the external circuitry used to receive the Caller ID information are described in more detail in commonly owned, co-filed, U.S. Patent application entitled, "Caller ID and Call Waiting for Multiple CPEs on a Single Telephone Line", by Harry W. Lewis, U.S. patent application Ser. No. 08/388,108, which is herein incorporated by reference in its entirety.

FIGS. 12–15 are flow charts which describe the operation of microprocessor 114 in accordance with one embodiment of the invention.

Figure 12A:
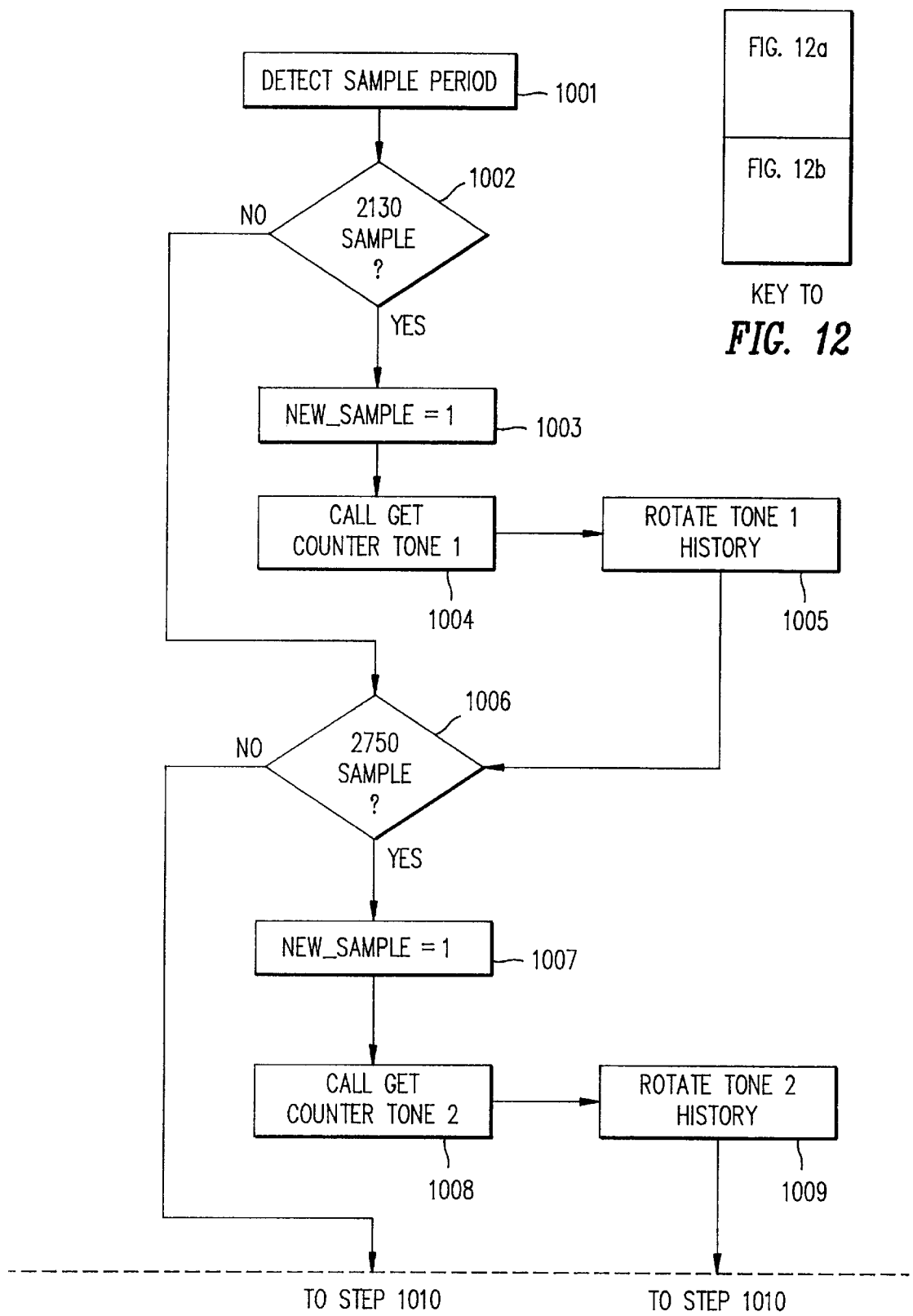
FIG. 12, which is comprised of FIGS. 12a–12b, FIG. 13, which is comprised of FIGS. 13a–13d, FIG. 14, and FIG. 15, which is comprised of FIGS. 15a and 15b, are flow charts describing the operation of the microprocessor of FIG. 1.
Figure 12B:
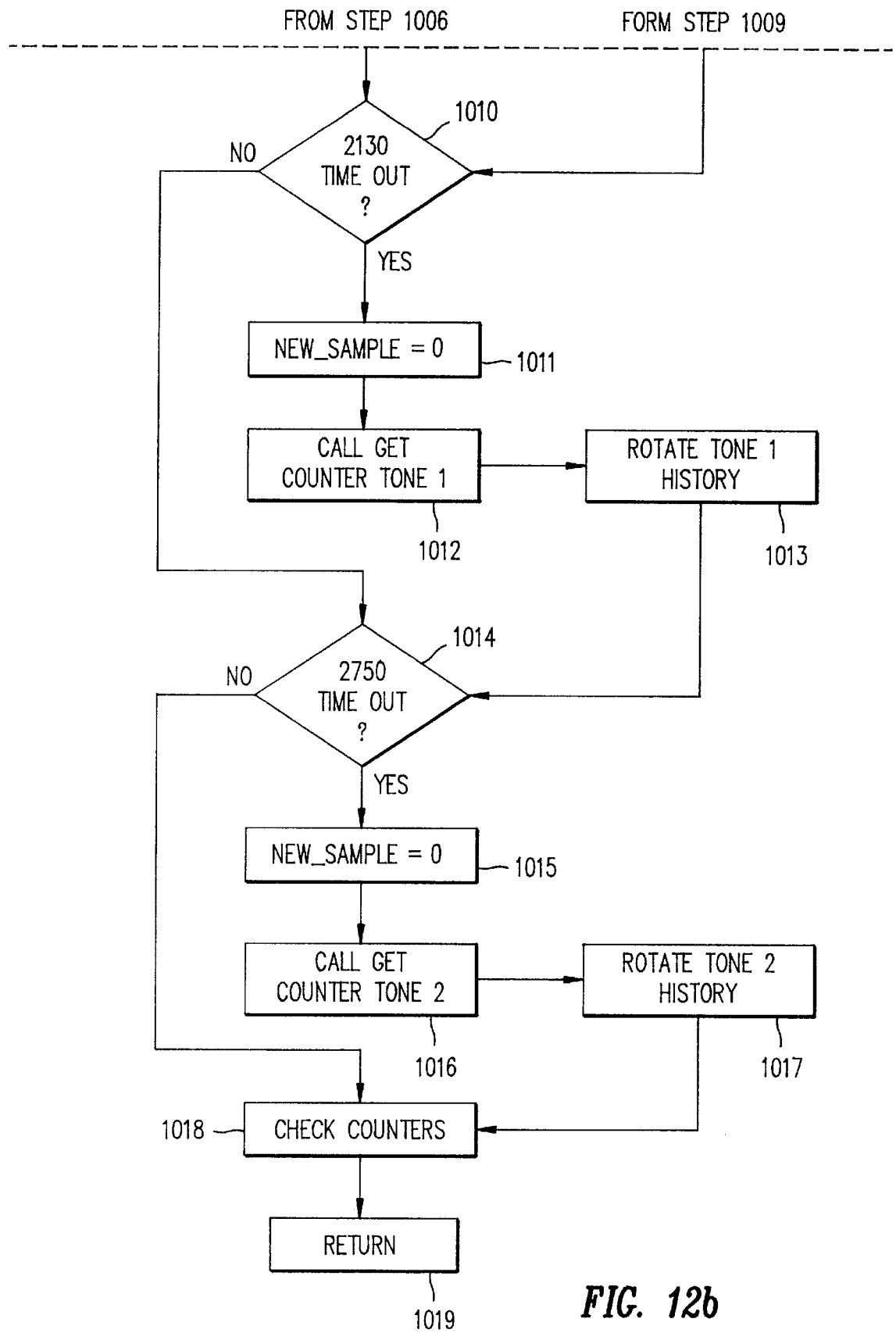

FIG. 12, which consists of FIGS. 12a and 12b as illustrated, is a top level flow chart which describes the operation of microprocessor 114. In Step 1001, a sample period is detected. As previously discussed, a sample period is detected when one of four events exist: (1) the first digital signal reaches its seventh cycle before its associated timeout timer expires, (2) the second digital signal reaches its ninth cycle before its associated timeout timer expires, (3) the timeout timer associated with the first digital signal expires before the first digital signal reaches its seventh cycle, or (4) the timeout timer associated with the second digital signal expires before the second digital signal reaches its ninth cycle.

In Steps 1002, 1006, 1010 and 1014, decisions are made as to whether the detected sample period corresponds to event (1), event (2), event (3) or event (4), respectively.

If the sample period was detected because the first digital signal reached its seventh cycle before its associated timeout timer expired (event (1)), processing continues with Steps 1003–1005. In Step 1003, the variable new_sample is set to one. As described in more detail below, new_sample will indicate whether a hit exists and will be used to determine whether or not to update the tone1_counter.

After new_sample has been set to one, processing continues with Step 1004, in which microprocessor 114 calls a subroutine entitled Get Counter Tone 1. FIG. 13, which includes FIGS. 13a–13d as illustrated, show the flow chart for Get Counter Tone 1.

Figure 13A:
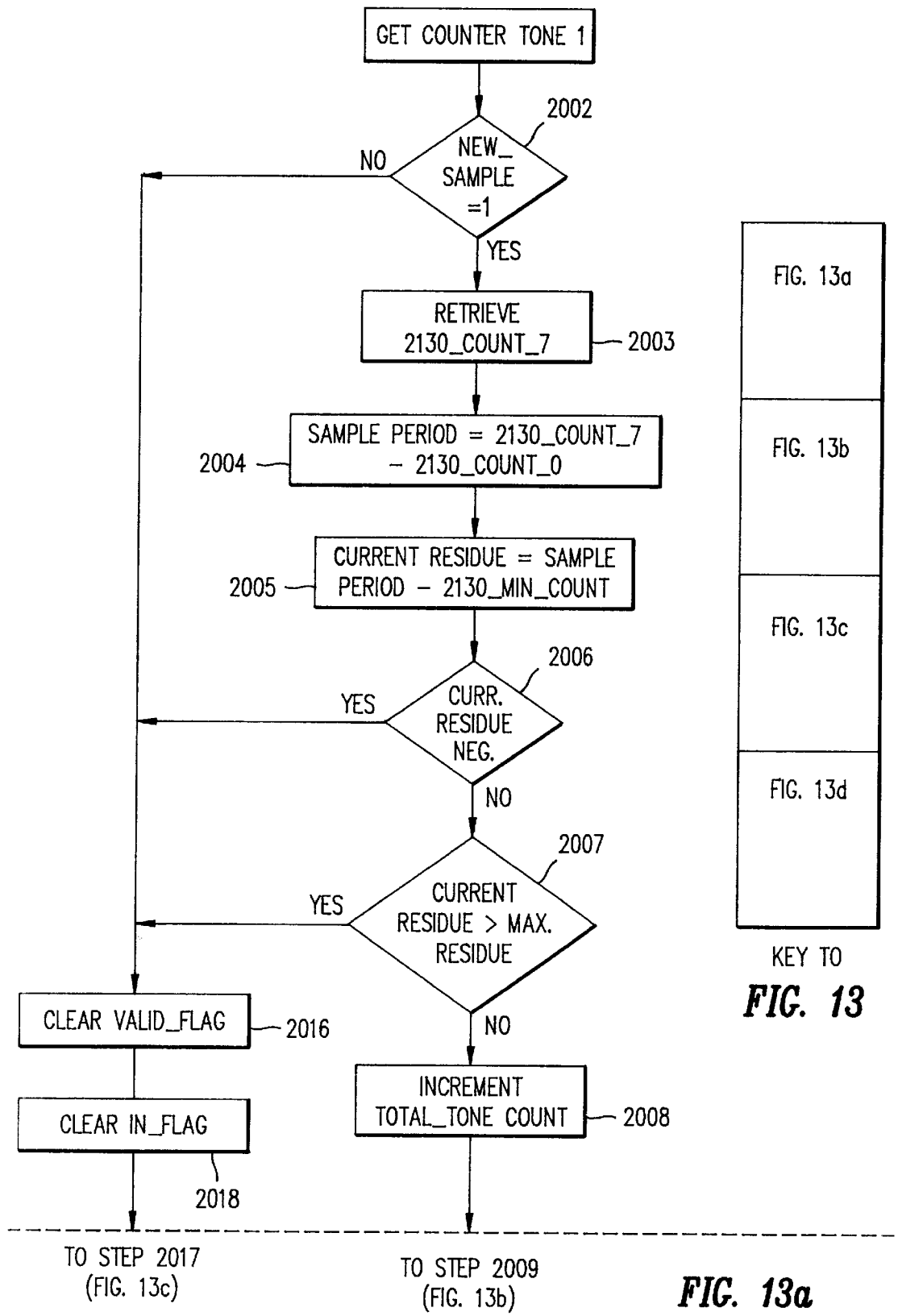

As illustrated in FIG. 13a, Get Counter Tone 1 is started and it is determined whether new_sample is equal to one (Step 2002). When Get Counter Tone 1 is entered from Steps 1002 and 1003 (FIG. 12a), new_sample will always be equal to one. In contrast, new_sample will always be equal to zero when Get Counter Tone 1 is entered from Steps 1010 and 1011 (FIG. 12b). A zero new_sample value immediately indicates that the sample period is invalid (because the associated timeout timer expired). If new_sample is equal to zero, processing continues with a valid_flag being cleared (Step 2016), an in_flag being cleared (Step 2018), and an invalid symbol FF being written to the counter history (Step 2017, FIG. 13c). These flags are described in more detail below.

If new_sample is equal to one, processing continues with Step 2003. In this Step, 2130_Count_7 (the count at which the seventh rising edge of the first digital signal was detected) is retrieved. In Step 2004, 2130_Count_0 (the count at which the first rising edge of the first digital signal was detected) is subtracted from 2130_Count_7 to determine the number of counts in the current sample period. In Step 2005, the minimum number of counts required for a valid count (i.e., 2900) is subtracted from the number of counts in the current sample period, thereby determining a current residue.

In Step 2006, the sign of the current residue is checked. If the residue is negative, the current sample period is not within the valid range. Because the current sample period is invalid, processing continues with the Steps 2016 and 2018 in which the valid_flag and the in_flag are cleared.

If the residue is not negative, processing continues with Step 2007. In Step 2007, the residue is compared with the maximum residue which can exist in a valid sample period. For example, the maximum residue which can exist for a valid sample period of the first digital signal is the maximum valid count (2983) minus the minimum valid count (2900), or 83. If the current residue is greater than the maximum residue, an invalid sample exists and processing continues to Steps 2016 and 2018. If the current residue is less than or equal to the maximum residue, processing continues to Step 2008.

In Step 2008, the total_tone count is incremented because a valid sample period has been detected. Processing then continues to Step 2009 (FIG. 13b), in which the valid_flag is checked. During the an initial pass through Get Counter Tone 1, or during any other pass which follows an invalid sample period, the valid_flag is not set. As a result, processing proceeds to Step 2010, in which the valid_flag is set. The valid_flag is thereby used to indicate whether the previous sample period was a valid sample period.

Figure 13B:
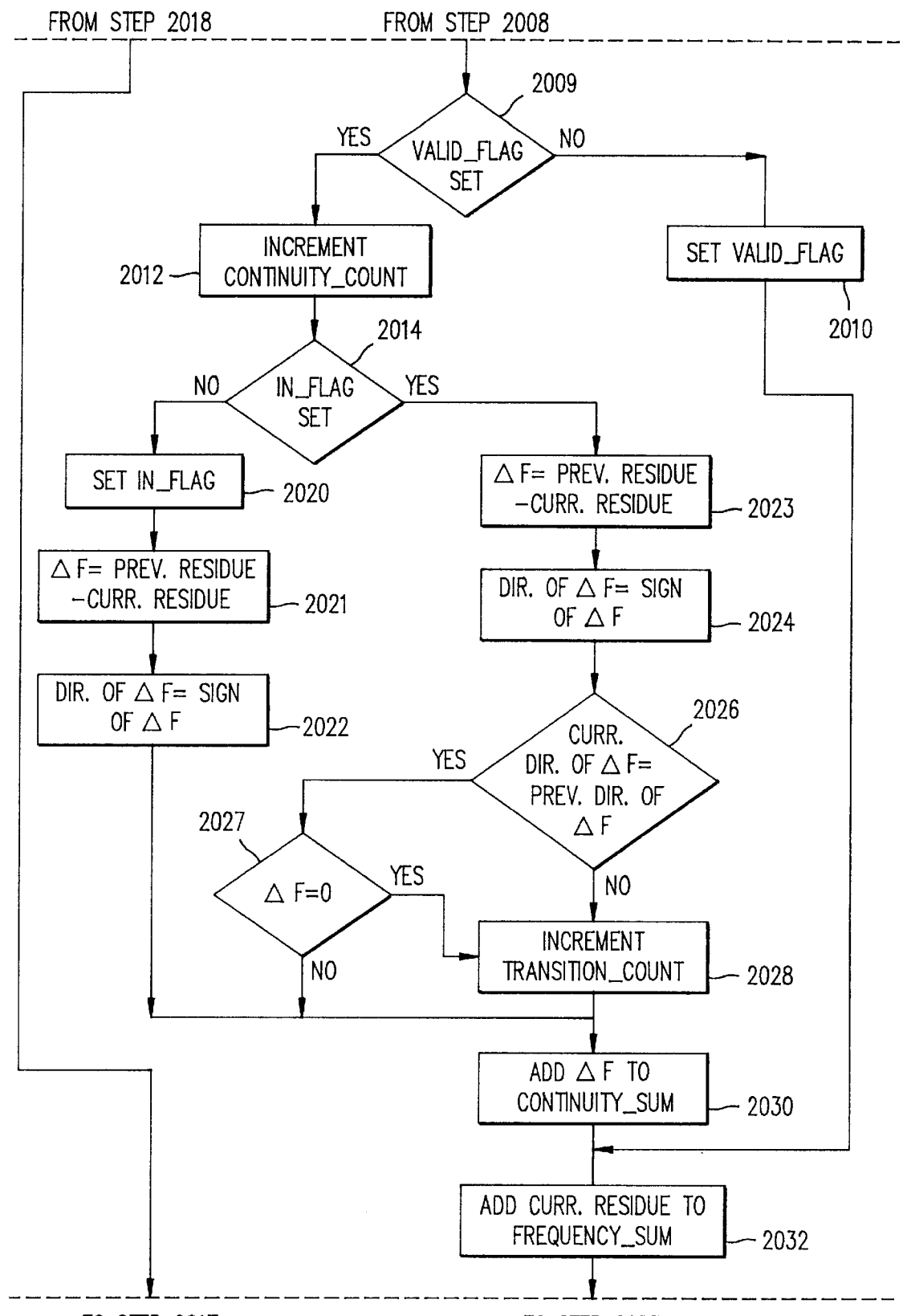
Figure 13C:
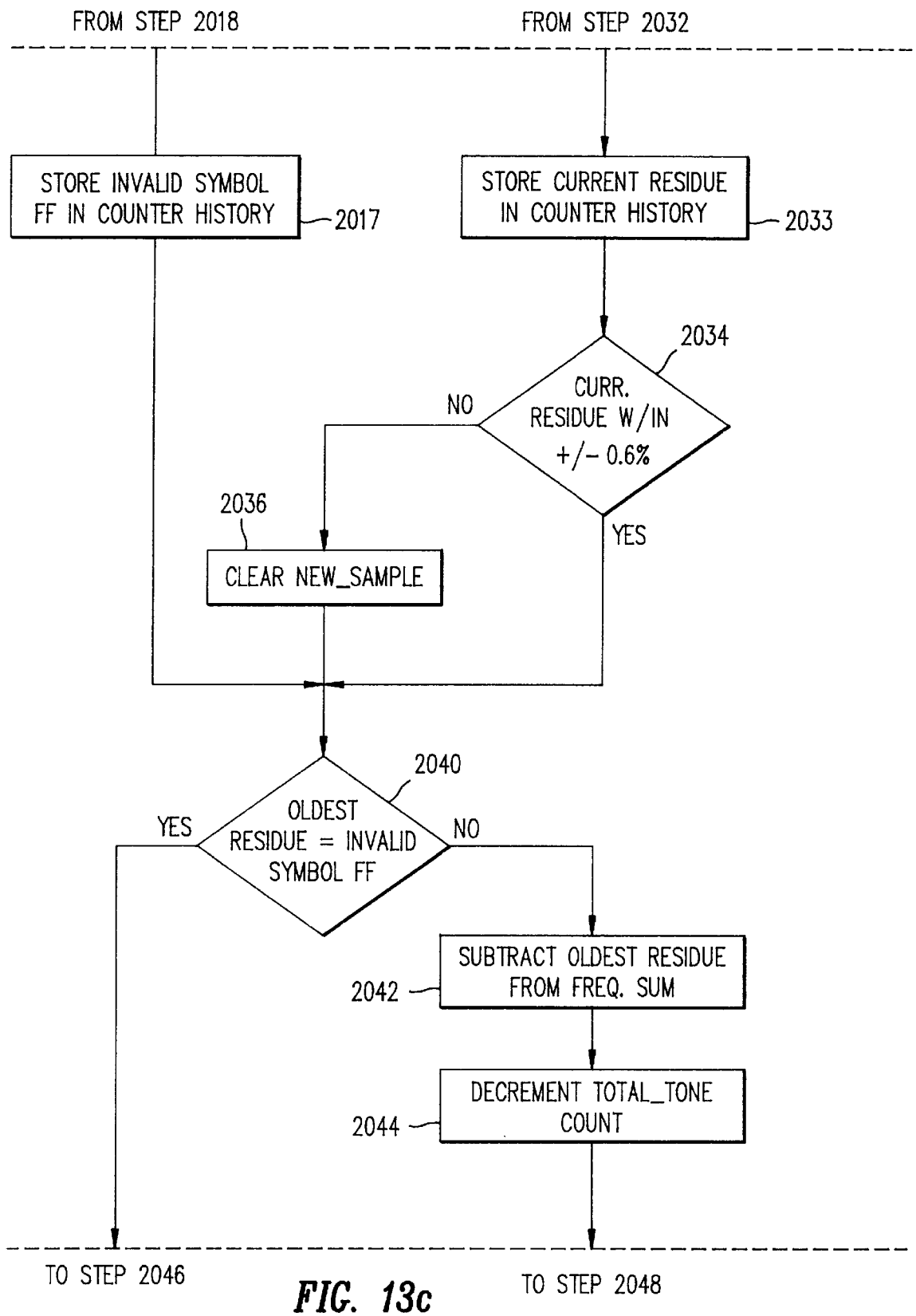
Figure 13D:
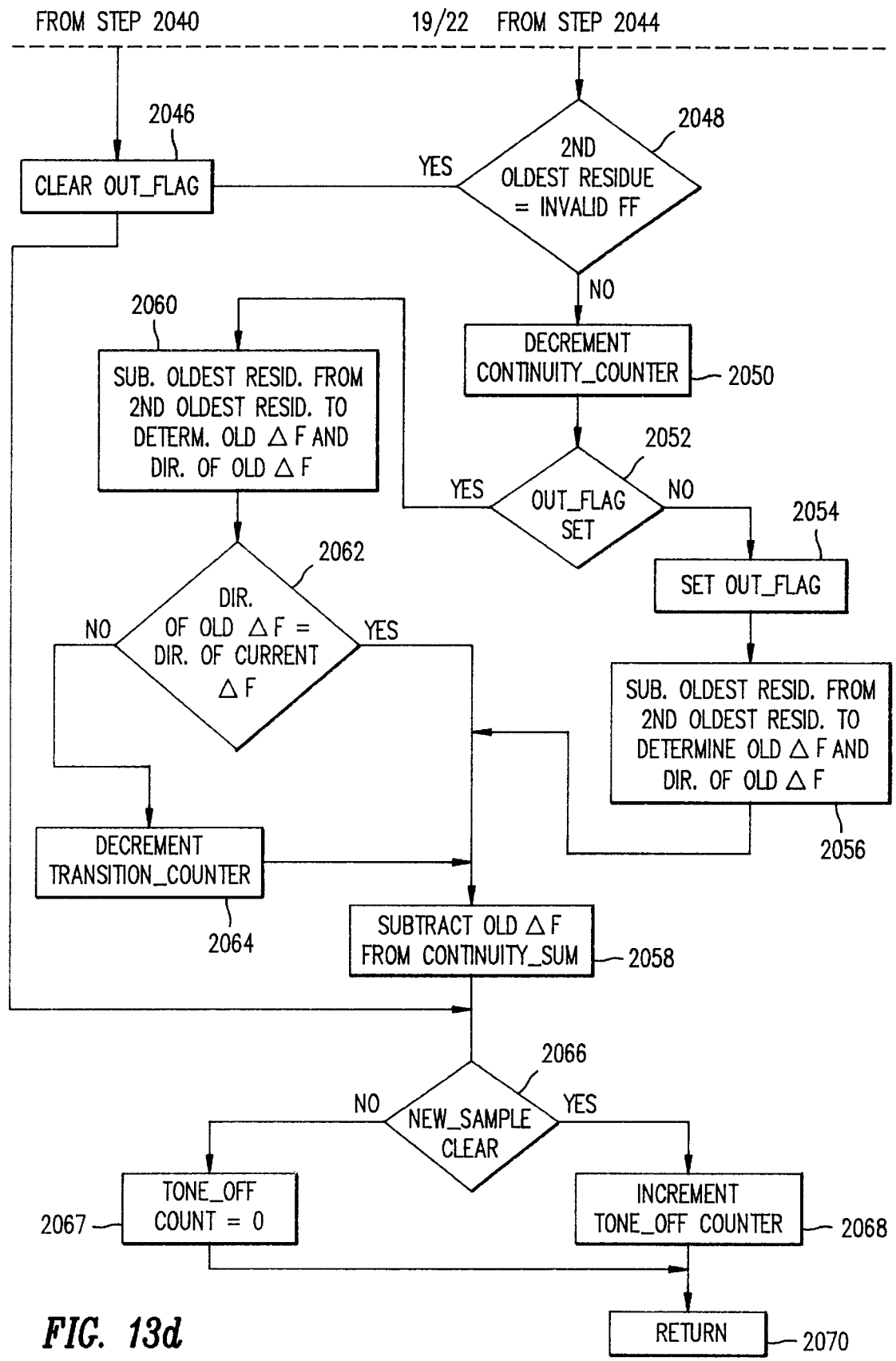

After the valid_flag is set in Step 2010, processing continues with Step 2032 (FIG. 13b) and Steps 2033–2036 (FIG. 13c). In Step 2032, the current residue is added to the frequency sum. In Step 2033, the current residue is stored in the corresponding counter history. In Step 2034, it is determined whether the current residue is within ±0.6% of the center frequency of 2130 hz. If the current residue has a value which indicates that the current sample period is within ±0.6% of the center frequency of 2130 hz, new_sample remains set. If the current residue has a value which indicates that the current sample period is not within ±0.6% of the center frequency of 2130 hz, new_sample is cleared in Step 2036. As described in more detail below, the final value of new_sample is subsequently used in Rotate Tone 1 History (Step 1005, FIG. 12a).

Returning now to Step 2009 (FIG. 13b), if the previous sample period was valid, the valid_flag will be set. As a result, processing proceeds to Step 2012, in which the count of the continuity counter is increased. Because the continuity counter is only increased when two consecutive sample periods are detected, continuity counter effectively counts the number of spans.

Processing proceeds to Step 2014, in which the status of the in_flag is checked. At the time that the first span is counted (i.e., during the second consecutive valid sample period), the in_flag will not be set. Consequently, processing will continue to Steps 2020–2022. In Step 2020, the in_flag is set. In Step 2021, the current residue is subtracted from the previous residue to determine the change in frequency between the current sample period and the previous sample period. In Step 2022, the direction of the change in frequency between the current sample period and the previous sample period is set to be the sign of the result of Step 2021. The change in frequency is then added to the continuity sum in Step 2030. Processing then proceeds through Steps 2032, 2034 and 2036 as previously described.

Returning again to Step 2009 (FIG. 13*b*), during a third (or higher) consecutive valid sample period, the valid flag is still set, and the continuity counter is again incremented (Step 2012). During a third (or higher) consecutive valid sample period, the in_flag will be set, thereby causing processing to proceed from Step 2014 to Step 2023 (FIG. 13*b*). In Step 2023, the current residue is subtracted from the previous residue to determine the change in frequency and the direction of the change in frequency between the current sample period and the previous sample period. In Step 2024, the direction of frequency change is set to the sign of the change of frequency direction determined in Step 2023. In Step 2026, the current direction of the change in frequency is compared to the previous direction of the change in frequency. If the current direction is the same as the previous direction, processing continues to Step 2027. In Step 2027, the current change of frequency is examined. If the current change of frequency is equal to zero, the transition counter is incremented (Step 2028). If the current change of frequency is not equal to zero, the transition counter is not incremented and processing continues as previously described to Steps 2030, 2032, 2034 and 2036. If the current direction is the same as the previous direction, the transition counter is incremented (Step 2028) and processing continues as previously described to Steps 2030, 2032, 2034 and 2036.

In the foregoing manner, the following variables are obtained: total_tone count, continuity count, transition count, continuity sum, frequency sum and new_sample.

After 28 cycles, the oldest residue (i.e., the 28th residue) will be replaced with the current residue. Consequently, the contributions made by the oldest residue to the total_tone count, the continuity count, the transition count and the continuity sum must be removed. This is accomplished by the steps as illustrated in the flow chart beginning at Step 2040 (FIG. 13*c*).

In Step 2040 (FIG. 13*c*), microprocessor 114 determines whether the oldest residue was invalid (i.e., an FF symbol). If the oldest residue was invalid, this residue did not contribute to the total_tone count, the continuity count, the transition count and the continuity sum. Consequently, no modifications need to be made to these values. Processing therefore proceeds to Step 2046 (FIG. 13*d*), in which an out_flag is cleared, and then to Step 2066. The out_flag is discussed in more detail below.

Returning now to Step 2040, if the oldest residue was valid, processing continues at Steps 2042 and 2044, in which the oldest residue is subtracted from the frequency sum and the total_tone count is decremented. These steps properly modify the frequency sum and total_tone count variables.

Processing continues with Step 2048 (FIG. 13*d*), in which the second oldest residue is examined. If the second oldest residue is invalid, then the oldest and second oldest residues necessarily did not contribute to the transition count, continuity count or the continuity sum. Processing therefore proceeds to Step 2046, in which the out_flag is cleared.

If the second oldest residue is valid, however, the oldest and second oldest residues contributed to the transition count, continuity count and the continuity sum, and these values must be adjusted. To do this, processing proceeds to Step 2050, which decrements the continuity counter. In Step 2052, the status of the out_flag is examined. The out_flag will only be set if during the previous pass through the flow chart, the oldest and second oldest residues were both valid (i.e., the oldest, second oldest and third oldest residues were valid). If the current pass through the flow chart represents the first time that both the oldest and second oldest residues were valid, processing proceeds to Step 2054, which sets the out_flag. Then, in Step 2056, the oldest residue is subtracted from the second oldest residue to determine the change of frequency and the direction of the change of frequency associated with the oldest and second oldest residues. Processing proceeds to Step 2058, in which the change of frequency associated with the oldest and second oldest residues is subtracted from the continuity sum. Processing then continues with Step 2066.

Returning now to Step 2052, the out_flag will be set if during the previous pass, both the oldest and second oldest residues were valid. Under these conditions, it is possible that these residues contributed to the count of the transition counter. Consequently, the transition counter must be modified appropriately. To accomplish this, processing proceeds to Step 2060, in which the oldest residue is subtracted from the second oldest residue to determine the change in frequency and direction of change in frequency associated with the oldest and second oldest residues.

Processing then proceeds to Step 2062 in which the direction of change in frequency between the current oldest and second oldest residues is compared with the direction of change in frequency between the previous oldest and second oldest residues. If these directions are different, the transition counter is decremented (Step 2064), thereby correcting the count of the transition counter. If these directions are the same, no correction to the transition counter is necessary. Either way, processing continues to Step 2058, where the change in frequency between the current oldest and second oldest residues are subtracted from the continuity sum.

Processing continues at Step 2066, where the value of new_sample is examined. If new_sample is equal to zero (i.e., the current sample period does not represent a "hit" as defined in Step 2034), the tone_off counter is incremented in Step 2068. If new_sample is equal to one (i.e., the current sample period represents a "hit" as defined in Step 2034), the tone_off counter is reset in Step 2067. Processing then exits from Get Counter Tone 1 (Step 2070) and proceeds to Rotate Tone 1 History (Step 1005) of FIG. 12*a*.

Figure 14:
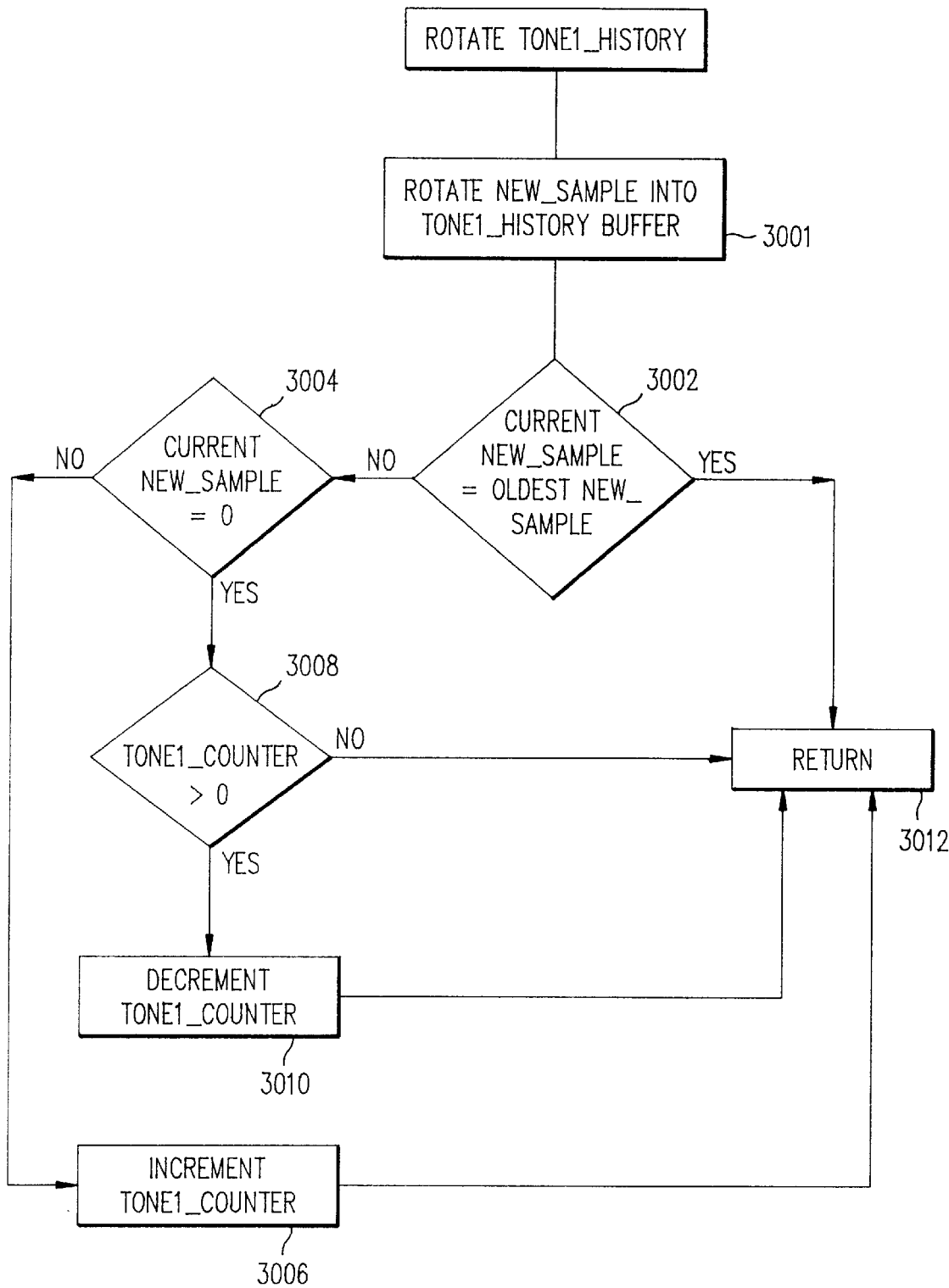

FIG. 14 is a flow chart illustrating the operation of Rotate Tone 1 History (Step 1005). The new_sample value is rotated into a tone1_history buffer in Step 3001. As previously described, new_sample will have a value of zero unless the current residue was within the range specified in Step 2034 (e.g., ±0.6%), in which case, new_sample will have a value of one. The tone1_history buffer is a 24-bit register which is continually updated during each sample period. After the tone1_history buffer has been filled, each additional new_sample value is "rotated" into the buffer by overwriting the oldest new_sample value in the buffer. Thus, the contents of the tone1_history buffer reflects the number of sample periods (out of the previous 24 sample periods) during which the residue was within the ±0.6% range. A tone1_counter keeps track of the number of one values stored in the tone1_history buffer.

In Step 3002, the current new_sample value is compared to the oldest new_sample value (which is being replaced by the current new_sample value). If the current new_sample value is equal to the oldest new_sample value, net count of the tone1_counter remains unchanged. Consequently, processing proceeds to return Step 3012.

If the current new_sample value is not equal to the oldest new_sample value, processing proceeds to Step 3004, where the current new_sample value is compared with zero. If the current new_sample value is not equal to zero (i.e., it is equal to one), the tone1_counter is incremented (Step 3006) and processing continues to Return Step 3012.

If the current new_sample value is equal to zero (Step 3004), the contents of the tone1_counter are compared with zero (Step 3008). If the contents of the tone1_counter are not greater than zero, processing continues to Return Step 3012. If the contents of the tone1_counter are greater than zero, the tone1_counter is decremented (Step 3010) and processing continues to return Step 3012. From return Step 3012, processing returns to Step 1006 (FIG. 12a).

At Step 1006, it is determined whether a sample period of the second digital signal was detected (event (2)). If so, processing proceeds with Steps 1007–1009. Steps 1007–1009 are similar to steps 1003–1005. In Step 1007, new_sample is set to one. In Step 1008, microprocessor 114 calls a subroutine called Get Counter Tone 2 which is a subroutine which operates in the same manner as Get Counter Tone 1 (Step 1004). In Step 1009, microprocessor 114 calls a subroutine called Rotate Tone 2 History which operates in the same manner as Rotate Tone 1 History (Step 1005).

If a sample period is detected because the timeout timer associated with the first digital signal has expired, (event (3)), processing proceeds with Steps 1010–1013 (FIG. 12b). In Step 1011, new_sample is set to zero, indicating that the sample period is invalid. Processing then proceeds to the subroutines Get Counter Tone 1 and Rotate Tone 1 History (See, Steps 1004, 1005). The zero value assigned to new_sample causes the detected sample period to be treated as invalid.

If a sample period is detected because the timeout timer associated with the second digital signal has expired, (event (4)), processing proceeds with Steps 1014–1017. In Step 1015, new_sample is set to zero. Processing then proceeds to the subroutines Get Counter Tone 2 and Rotate Tone 2 History (See, Steps 1008, 1009). The zero value assigned to new_sample causes the detected sample period to be treated as invalid.

Figure 15A:
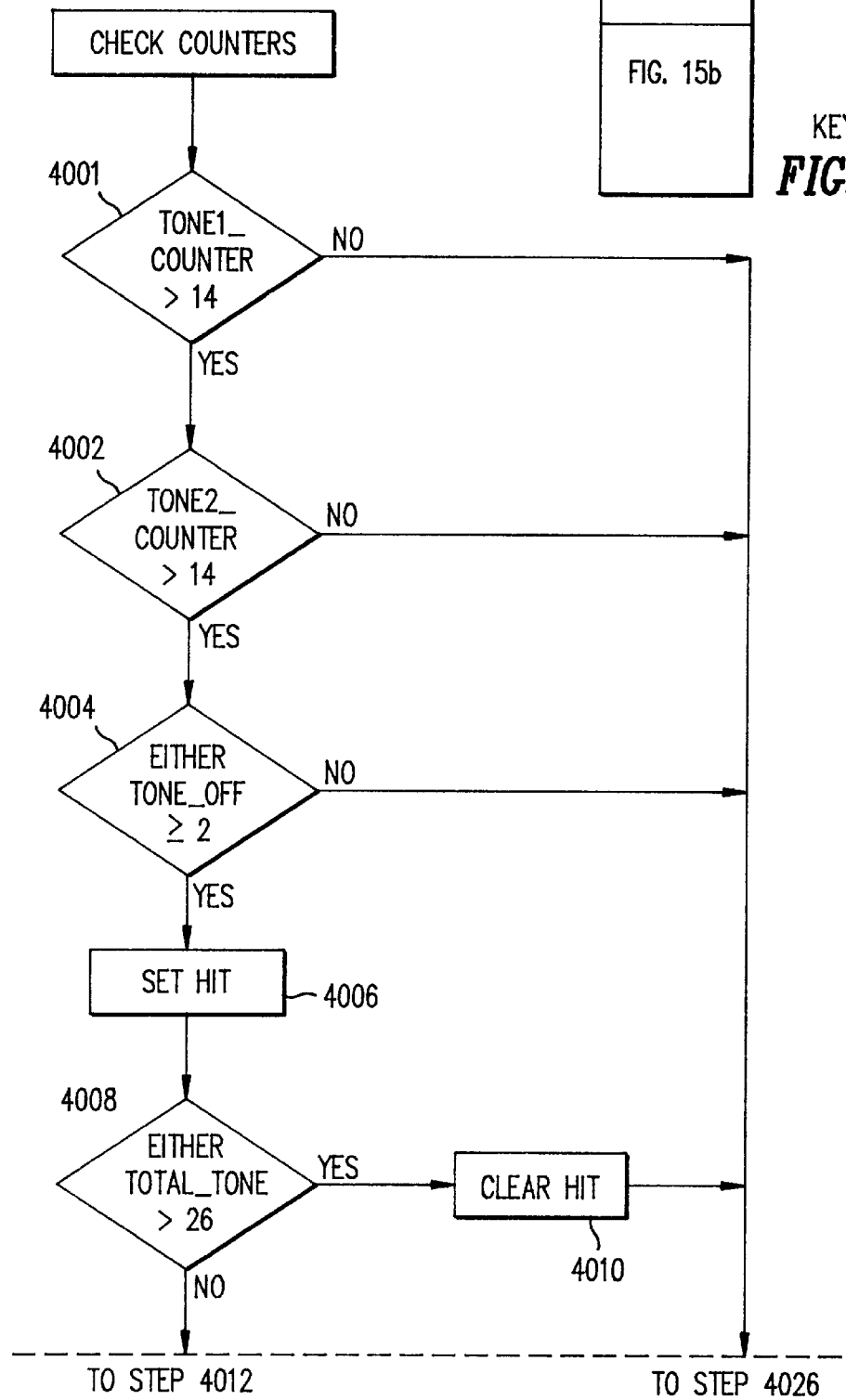
Figure 15B:
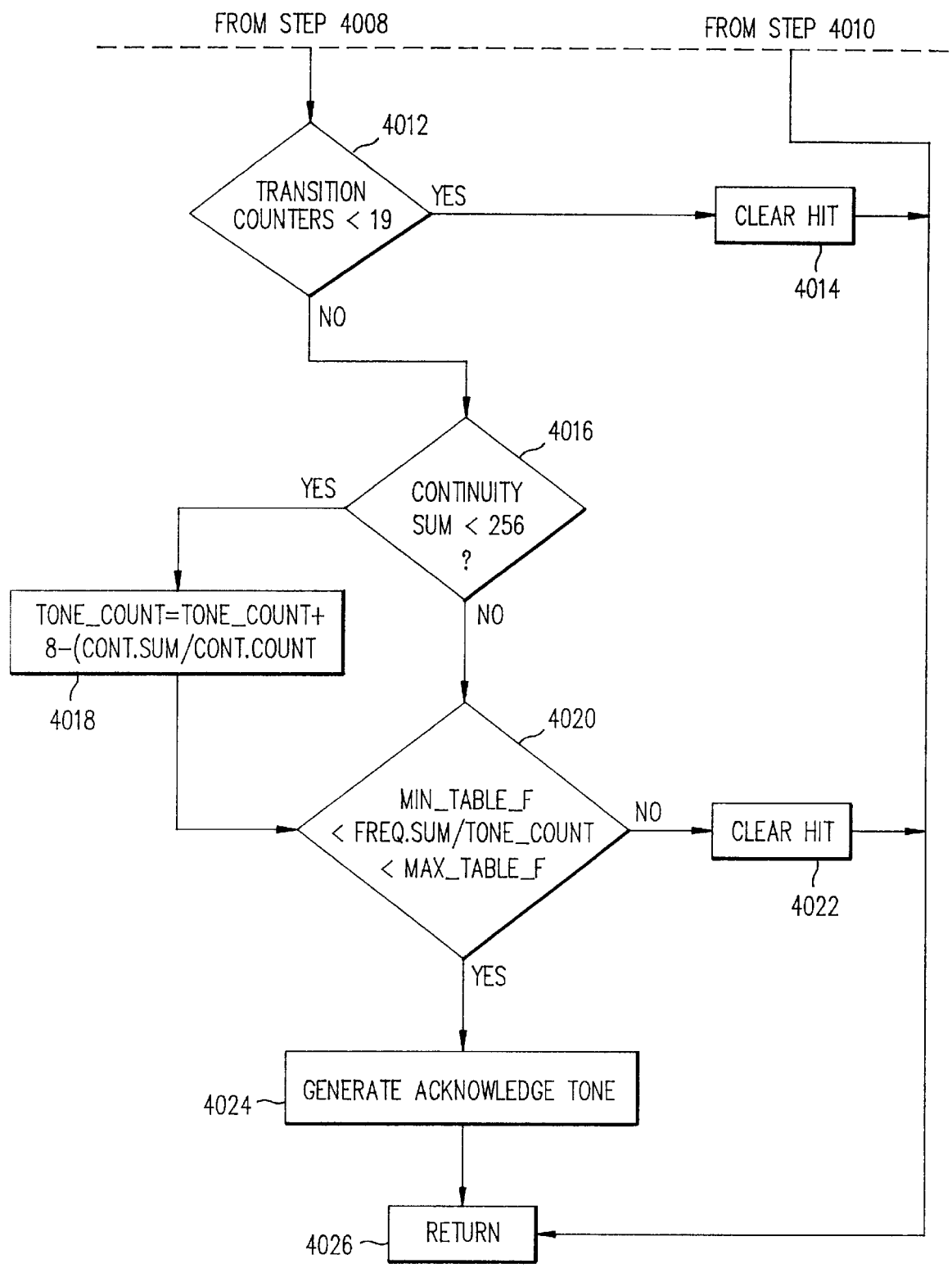

Processing then continues to Step 1018, entitled Check_Counters. FIG. 15, which includes FIGS. 15a and 15b as illustrated, is a flow chart illustrating the operation of Check_Counters. In Step 4001, the contents of the tone1_counter are examined. If the count of tone1_counter is not greater than or equal to 14, processing continues with return Step 4026, and the Check_Counters routine is exited without generating an acknowledge signal. The contents of the tone2_counter are examined in a similar manner in Step 4002. The purpose of Steps 4001 and 4002 is to ensure that for at least 14 of the last 24 sample periods of each of the first and second digital signals, the frequency requirements of ±0.6% as set forth in Step 2034 (FIG. 13c) are met.

In Step 4004, the contents of the tone_off counters associated with the first and second digital signals are examined. If at least one of the tone_off counters has a count of two or more, the associated digital signal has not been valid for two or more sample periods. This indicates that if a CAS tone were previously being received, this CAS tone has now ended. If neither tone_off counter has a count of two or more (i.e., a signal is still being received), processing continues to Return Step 4026. If either tone_off counter has a count of two or more, a hit flag is set in Step 4006. If the hit flag remains set through the following steps, an acknowledge signal is transmitted. However, if the hit flag is cleared, processing continues to return Step 4026 without generating an acknowledge signal.

In Step 4008, the total tone count is examined. If the total_tone count is greater than 26, the detected signal is deemed to be too long to be caused by a valid CAS tone and the hit flag is cleared (Step 4010). If the total_tone count is not greater than 26, processing proceeds to Step 4012 (FIG. 15b).

In Step 4012, the contents of the transition counters for both the first and second digital signals are examined. If the combined transition count for both signals is less than 19, it is assumed that a valid CAS tone is not present and the hit flag is cleared (Step 4014). If the combined transition count is greater than or equal to 19, processing continues to Step 4016.

In Step 4016, the continuity sum is examined. As previously discussed, the continuity sum represents the sum of the frequency changes which occurred during the last 28 sample periods. If the continuity sum is less than 256 counts, processing proceeds to Step 4018. In Step 4018, the total tone_count for each signal is modified by adding a number from 8 to 0. The number added to the tone_count is equal to 8−(continuity sum/continuity count). The continuity sum divided by the continuity count is equal to the average change of frequency between the valid sample periods. Thus, the tone_count is artificially increased if the average change of frequency between valid sample periods is small (i.e., if the valid sample periods indicate a relatively constant frequency digital signal).

Processing proceeds to Step 4020, in which the frequency sum is divided by the total_tone count to determine the average frequency. In Step 4020, the total_tone count is also used to determine the frequency tolerance in a look-up table as previously described in connection with FIG. 10. If the average frequency does not fall within the range specified in the look-up table of FIG. 10, the hit flag is cleared (Step 4022), and processing continues to Return Step 4026. If the average frequency falls within the range specified in the look-up table of FIG. 10, a valid CAS tone is assumed to exist, and processing continues to Step 4024, where the acknowledge signal is generated.

Although the invention has been described in connection with several embodiments, it is understood that this invention is not limited to the embodiments disclosed, but is capable of various modifications which would be apparent to one of ordinary skill in the art. Thus, the invention is limited only by the following claims.

What is claimed is:

1. A method of determining whether a detected signal corresponds to a predetermined signal, the method comprising the steps of:
   sampling the frequency of the detected signal during a plurality of sample periods;
   determining whether the sampled frequency represents a valid sample period;
   calculating the change of frequency between successive valid sample periods;
   maintaining a sum of each calculated change of frequency;
   maintaining a count of the pairs of successive valid sample periods;
   dividing the sum by the count to obtain an average change of frequency; and
   using the average change of frequency to select a frequency tolerance which the detected signal must meet to find correspondence with the predetermined signal.

2. The method of claim 1, wherein the predetermined signal represents one frequency of a customer premises equipment alerting signal (CAS) tone.

3. The method of claim 1, further comprising the step of providing a narrow frequency tolerance for a high average change of frequency, and a broad frequency tolerance for a low average change of frequency.

4. A method of determining whether a detected signal corresponds to a predetermined signal having first and second nominal frequencies, the method comprising the steps of:

sampling the detected signal during a plurality of sample periods;

during each sample period, determining whether the detected signal has a first frequency component within a first frequency range which includes the first nominal frequency;

during each sample period, determining whether the detected signal has a second frequency component within a second frequency range which includes the second nominal frequency;

maintaining a first count of the number of sample periods during which the first frequency component is within the first frequency range;

maintaining a second count of the number of sample periods during which the second frequency component is within the second frequency range;

using the first and second counts to determine whether the detected signal corresponds to the predetermined signal;

during each sample period, determining whether the first frequency component does not have a frequency within the first frequency range;

during each sample period, determining whether the second frequency component does not have a frequency within the second frequency range;

maintaining a third count of the number of sample periods during which the first frequency component is not within the first frequency range;

maintaining a fourth count of the number of sample periods during which the second frequency component is not within the second frequency range; and using the third and fourth counts to determine whether the detected signal corresponds to the predetermined signal.

5. The method of claim 4, further comprising the step of determining that the detected signal corresponds to the predetermined signal if the total of the first and second counts exceeds a preselected number.

6. The method of claim 4, further comprising the step of determining that the detected signal corresponds to the predetermined signal if the total of the first and second counts exceeds a first preselected number and either the third count or the fourth count exceeds a second preselected number.

7. A method of determining whether a detected signal corresponds to a predetermined signal having first and second nominal frequencies, the method comprising the steps of:

sampling the detected signal during a plurality of sample periods;

during each sample period, determining whether the detected signal has a first frequency component within a first frequency range which includes the first nominal frequency;

during each sample period, determining whether the detected signal has a second frequency component within a second frequency range which includes the second nominal frequency;

maintaining a first count of the number of sample periods during which the first frequency component is within the first frequency range;

maintaining a second count of the number of sample periods during which the second frequency component is within the second frequency range;

using the first and second counts to determine whether the detected signal corresponds to the predetermined signal;

for each sample period, determining whether the first frequency component falls within a third frequency range which is wider than the first frequency range;

maintaining a third count of the number of times the first frequency component falls within the third frequency range;

for each sample period, determining whether the second frequency component falls within a fourth frequency range which is wider than the second frequency range;

maintaining a fourth count of the number of times the second frequency component falls within the fourth frequency range; and determining that the detected signal does not correspond to the predetermined signal if either the third count or the fourth count exceeds a preselected count.

8. A method of determining whether a detected signal corresponds to a predetermined signal having first and second nominal frequencies, the method comprising the steps of:

sampling a first frequency component of the detected signal to determine the time required for the first frequency component to complete a first number of cycles;

sampling a second frequency component of the detected signal to determine the time required for the second frequency component to complete a second number of cycles; and selecting the first number of cycles and the second number of cycles such that the time required for the first frequency component to complete the first number of cycles is approximately equal to the time required for the second frequency component to complete the second number of cycles when the detected signal corresponds to the predetermined signal.

9. The method of claim 8, wherein the first frequency component has a frequency of approximately 2130 hz and the second frequency component has a frequency of approximately 2750 hz.

10. A circuit for determining when a detected analog tone corresponds to a predetermined analog tone having a first nominal frequency and a second nominal frequency, the circuit comprising:

a first bandpass filter having an input terminal connected to receive the detected tone, wherein the first bandpass filter passes a first analog signal at frequencies approximately equal to the first nominal frequency;

a second bandpass filter having an input terminal connected to receive the detected tone, wherein the second bandpass filter passes a second analog signal at frequencies approximately equal to the second nominal frequency;

a first threshold limiter circuit having an input terminal connected to an output terminal of the first bandpass filter, wherein the first threshold limiter circuit generates a first digital signal in response to the first analog signal, the first digital signal having a frequency equal to the frequency of the first analog signal;

a second threshold limiter circuit having an input terminal connected to an output terminal of the second bandpass filter, wherein the second threshold limiter circuit generates a second digital signal in response to the second analog signal, the second digital signal having a frequency equal to the frequency of the second analog signal; and a microprocessor having input terminals connected to the first and second threshold limiter circuits, wherein the microprocessor monitors the first and second digital signals to determine a first period required for the first digital signal to complete a first predetermined number of cycles, and a second period required for the second digital signal to complete a second predetermined number of cycles, and wherein the microprocessor further determines from the first and second periods whether the detected signal corresponds to the predetermined signal.

11. The circuit of claim 10, further comprising a dual tone multi-frequency (DTMF) generator connected to the microprocessor, wherein the microprocessor causes the DTMF generator to generate an acknowledge signal when the microprocessor determines that the detected signal corresponds to the predetermined signal.

12. A circuit for determining whether a detected signal corresponds to a predetermined signal, the circuit comprising:

means for sampling the frequency of the detected signal during a plurality of sample periods;

means for determining whether the sampled frequency represents a valid sample period;

means for calculating the change of frequency between successive valid sample periods;

means for maintaining a sum of each calculated change of frequency;

means for maintaining a count of the pairs of successive valid sample periods;

means for dividing the sum by the count to obtain an average change of frequency; and means for using the average change of frequency to select a frequency tolerance which the detected signal must meet to find correspondence with the predetermined signal.

13. The circuit of claim 12, wherein the predetermined signal represents one frequency of a customer premises equipment alerting signal (CAS) tone.

14. The circuit of claim 12, further comprising means for providing a narrow frequency tolerance for a high average change of frequency, and a broad frequency tolerance for a low average change of frequency.

15. A circuit for determining whether a detected signal corresponds to a predetermined signal having first and second nominal frequencies, the circuit comprising:

means for sampling the detected signal during a plurality of sample periods;

means for determining during each sample period whether the detected signal has a first frequency component within a first frequency range which includes the first nominal frequency;

means for determining during each sample period whether the detected signal has a second frequency component within a second frequency range which includes the second nominal frequency;

means for maintaining a first count of the number of sample periods during which the first frequency component is within the first frequency range;

means for maintaining a second count of the number of sample periods during which the second frequency component is within the second frequency range;

means for using the first and second counts to determine whether the detected signal corresponds to the predetermined signal;

means for determining during each sample period whether the first frequency component does not have a frequency within the first frequency range;

means for determining during each sample period whether the second frequency component does not have a frequency within the second frequency range;

means for maintaining a third count of the number of sample periods during which the first frequency component is not within the first frequency range;

means for maintaining a fourth count of the number of sample periods during which the second frequency component is not within the second frequency range; and means for using the third and fourth counts to determine whether the detected signal corresponds to the predetermined signal.

16. The circuit of claim 15, further comprising means for determining that the detected signal corresponds to the predetermined signal if the total of the first and second counts exceeds a preselected number.

17. The circuit of claim 15, further comprising means for determining that the detected signal corresponds to the predetermined signal if the total of the first and second counts exceeds a first preselected number and either the third count or the fourth count exceeds a second preselected number.

18. A circuit for determining whether a detected signal corresponds to a predetermined signal having first and second nominal frequencies, the circuit comprising:

means for sampling the detected signal during a plurality of sample periods;

means for determining during each sample period whether the detected signal has a first frequency component within a first frequency range which includes the first nominal frequency;

means for determining during each sample period whether the detected signal has a second frequency component within a second frequency range which includes the second nominal frequency;

means for maintaining a first count of the number of sample periods during which the first frequency component is within the first frequency range;

means for maintaining a second count of the number of sample periods during which the second frequency component is within the second frequency range;

means for using the first and second counts to determine whether the detected signal corresponds to the predetermined signal;

means for determining for each sample period whether the first frequency component falls within a third frequency range which is wider than the first frequency range;

means for maintaining a third count of the number of times the first frequency component falls within the third frequency range;

means for determining for each sample period whether the second frequency component falls within a fourth frequency range which is wider than the second frequency range;

means for maintaining a fourth count of the number of times the second frequency component falls within the fourth frequency range; and means for determining that the detected signal does not correspond to the predetermined signal if either the third count or the fourth count exceeds a preselected count.

19. A circuit for determining whether a detected signal corresponds to a predetermined signal having first and second nominal frequencies, the circuit comprising:

means for sampling a first frequency component of the detected signal to determine the time required for the first frequency component to complete a first number of cycles;

means for sampling a second frequency component of the detected signal to determine the time required for the second frequency component to complete a second number of cycles; and means for selecting the first number of cycles and the second number of cycles such that the time required for the first frequency component to complete the first number of cycles is approximately equal to the time required for the second frequency component to complete the second number of cycles when the detected signal corresponds to the predetermined signal.

20. The circuit of claim 19, wherein the first frequency component has a frequency of approximately 2130 hz and the second frequency component has a frequency of approximately 2750 hz.

21. A method of determining whether a detected signal corresponds to a predetermined signal having first and second nominal frequencies, the method comprising the steps of:

filtering the detected signal with a first bandpass filter which passes a first analog component of the detected signal having a frequency approximately equal to the first nominal frequency;

filtering the detected signal with a second bandpass filter which passes a second analog component of the detected signal having a frequency approximately equal to the second nominal frequency;

converting the first analog component into a first digital signal;

converting the second analog component into a second digital signal;

monitoring the first digital signal to determine a first period required for the first digital signal to complete a first predetermined number of cycles;

monitoring the second digital signal to determine a second period required for the second digital signal to complete a second predetermined number of cycles;

determining whether the first period is representative of a signal with a frequency within a first frequency range which includes the first nominal frequency;

determining whether the second period is representative of a signal with a frequency within a second frequency range which includes the second nominal frequency;

maintaining a first count of the number of times that the first period is representative of a signal with a frequency within the first frequency range;

maintaining a second count of the number of times that the second period is representative of a signal with a frequency within the second frequency range; and using the first and second counts to determine whether the detected signal corresponds to the predetermined signal.

22. The method of claim 21, further comprising the step of determining that the detected signal corresponds to the predetermined signal if the total of the first and second counts exceeds a preselected number.

23. The method of claim 21, further comprising the steps of:

determining whether the first period is not representative of a signal having a frequency within the first frequency range;

determining whether the second period is not representative of a signal having a frequency within the second frequency range;

maintaining a third count of the number of times which the first period is not representative of a signal having a frequency within the first frequency range;

maintaining a fourth count of the number of times which the second period is not representative of a signal having a frequency within the second frequency range; and using the third and fourth counts to determine whether the detected signal corresponds to the predetermined signal.

24. The method of claim 23, further comprising the step of determining that the detected signal corresponds to the predetermined signal if the total of the first and second counts exceeds a first preselected number and either the third count or the fourth count exceeds a second preselected number.

25. The method of claim 21, further comprising the steps of:

determining whether the first period is representative of a signal having a frequency which falls within a third frequency range which is wider than the first frequency range;

maintaining a third count of the number of times the first period is representative of a signal having a frequency which falls within the third frequency range;

determining whether the second period is representative of a signal having a frequency which falls within a fourth frequency range which is wider than the second frequency range;

maintaining a fourth count of the number of times the second period is representative of a signal having a frequency which falls within the fourth frequency range; and determining that the detected signal does not correspond to the predetermined signal if either the third count or the fourth count exceeds a preselected count.

26. A circuit for determining whether a detected signal corresponds to a predetermined signal having first and second nominal frequencies, the circuit comprising:

a first bandpass filter which passes a first analog component of the detected signal having a frequency approximately equal to the first nominal frequency;

a second bandpass filter which passes a second analog component of the detected signal having a frequency approximately equal to the second nominal frequency;

means for converting the first analog component into a first digital signal;

means for converting the second analog component into a second digital signal;

means for monitoring the first digital signal to determine a first period required for the first digital signal to complete a first predetermined number of cycles;

means for monitoring the second digital signal to determine a second period required for the second digital signal to complete a second predetermined number of cycles;

means for determining whether the first period is representative of a signal with a frequency within a first frequency range which includes the first nominal frequency;

means for determining whether the second period is representative of a signal with a frequency within a second frequency range which includes the second nominal frequency;

means for maintaining a first count of the number of times that the first period is representative of a signal with a frequency within the first frequency range;

means for maintaining a second count of the number of times that the second period is representative of a signal with a frequency within the second frequency range; and means for determining whether the detected signal corresponds to the predetermined signal in response to the first and second counts.

* * * * *